(12) United States Patent
Chiba

(10) Patent No.: US 10,289,584 B2
(45) Date of Patent: May 14, 2019

(54) USING A STANDARD USB TYPE-C CONNECTOR TO COMMUNICATE BOTH USB 3.X AND DISPLAYPORT DATA

(71) Applicant: Toshiba Client Solutions CO., LTD, Tokyo (JP)

(72) Inventor: Hiroaki Chiba, Sagamihara Kanagawa (JP)

(73) Assignee: Toshiba Client Solutions Co., LTD., Tokyo (JP)

( * ) Notice: Subject to any disclaimer, the term of this patent is extended or adjusted under 35 U.S.C. 154(b) by 47 days.

(21) Appl. No.: 15/399,402

(22) Filed: Jan. 5, 2017

(65) Prior Publication Data

US 2017/0192924 A1 Jul. 6, 2017

Related U.S. Application Data

(60) Provisional application No. 62/275,746, filed on Jan. 6, 2016.

(51) Int. Cl.
*G06F 13/38* (2006.01)
*G06F 13/42* (2006.01)

(52) U.S. Cl.
CPC ........ *G06F 13/385* (2013.01); *G06F 13/4282* (2013.01)

(58) Field of Classification Search
CPC ............................ G06F 13/385; G06F 13/4282
See application file for complete search history.

(56) References Cited

U.S. PATENT DOCUMENTS

| | | |
|---|---|---|
| 7,865,629 B1 | 1/2011 | Tantos et al. |
| 2011/0125601 A1 | 5/2011 | Caprenter et al. |
| 2011/0125930 A1 | 5/2011 | Tantos et al. |
| 2011/0126005 A1 | 5/2011 | Caprenter et al. |
| 2013/0086297 A1 | 4/2013 | Siulinski et al. |
| 2014/0229326 A1 | 8/2014 | Carpenter et al. |
| 2016/0110305 A1* | 4/2016 | Hundal ............... G06F 13/4022 710/316 |
| 2016/0112711 A1* | 4/2016 | Hundal ............... G06F 13/4282 375/240.26 |
| 2017/0017595 A1* | 1/2017 | Schnell ................. G06F 13/385 |

FOREIGN PATENT DOCUMENTS

| | | |
|---|---|---|
| JP | 2010-288283 | 12/2010 |
| JP | 2013-526149 | 6/2013 |
| JP | 2014-147041 | 8/2014 |

\* cited by examiner

*Primary Examiner* — Idriss N Alrobaye
*Assistant Examiner* — Ronald T Modo
(74) *Attorney, Agent, or Firm* — Rutan & Tucker, LLP

(57) ABSTRACT

According to one embodiment, an electronic device includes a USB Type-C connector connected to a second electronic device, a processor connected to the USB Type-C connector and including four terminals outputting an image signal, and a USB controller connected to the USB Type-C connector and including two terminals outputting USB 3.x signal. The USB Type-C connector includes two USB 2.0 pins D and D defined under USB Type-C standard and four USB 3.x pins TX1, RX1, TX2 and RX2 defined under the USB Type-C standard. The image signal and the USB 3.x signal are output via the two USB 2.0 pins D and D and the four USB 3.x pins TX1, RX1, TX2 and RX2.

15 Claims, 17 Drawing Sheets

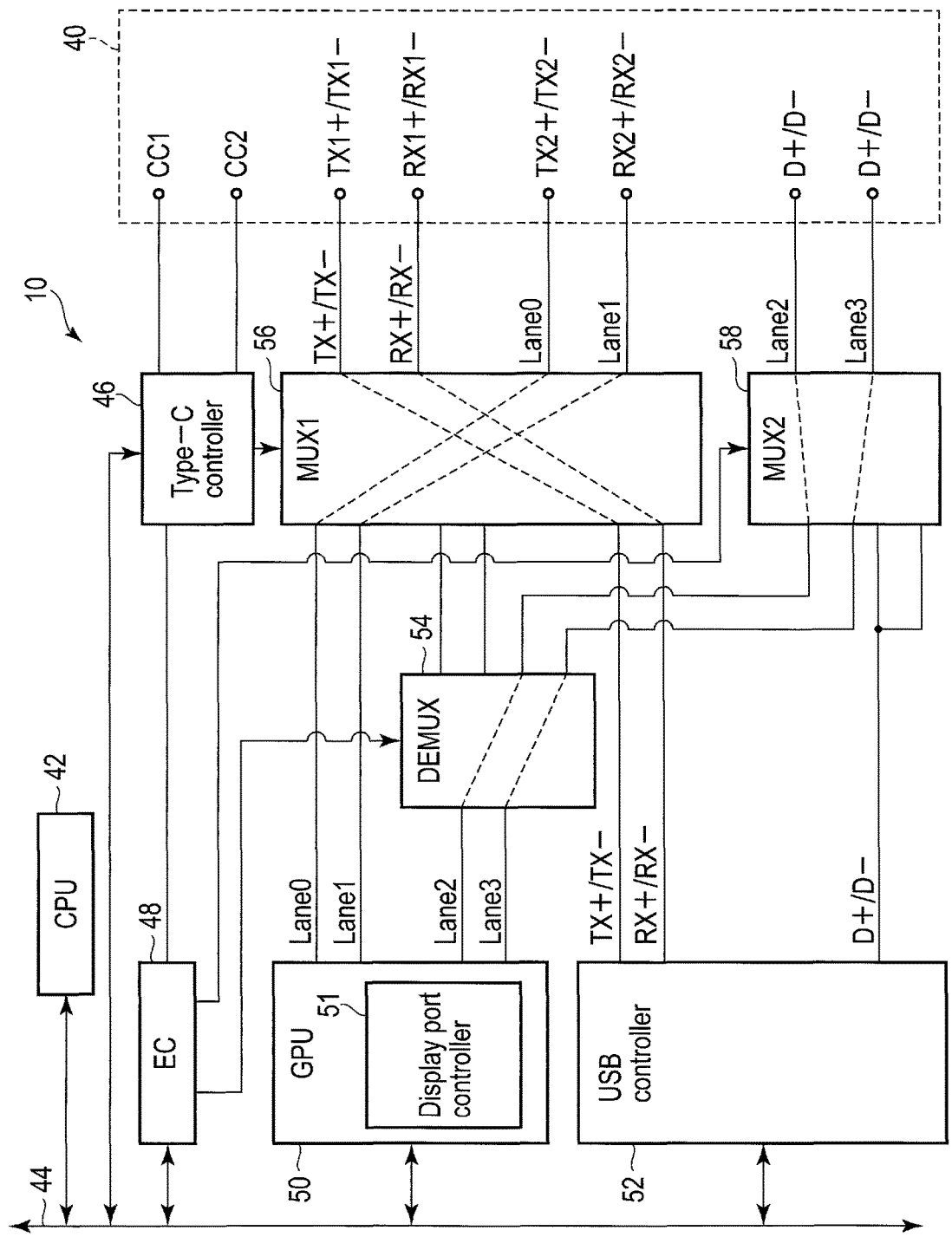
F I G. 2A

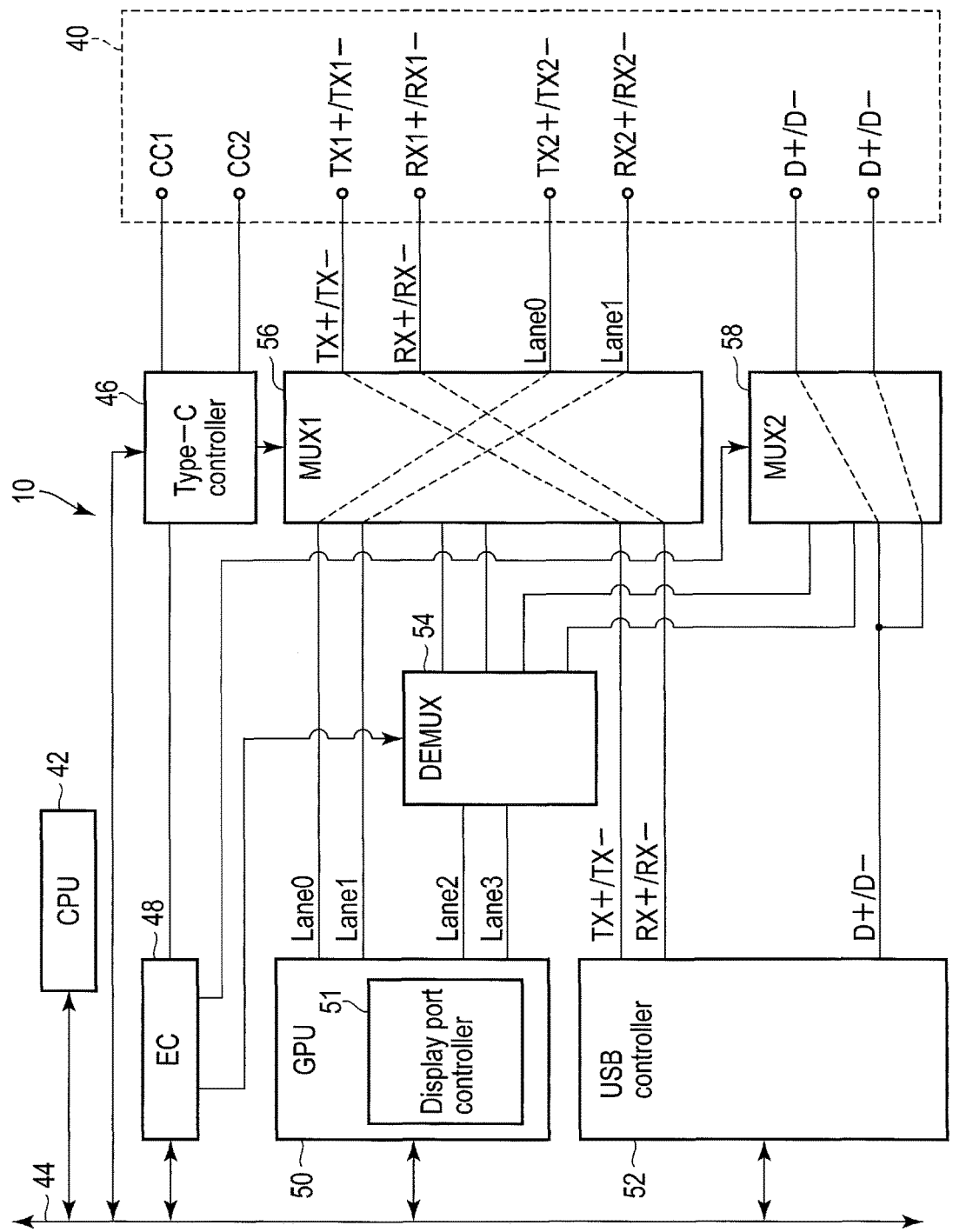
F I G. 4A

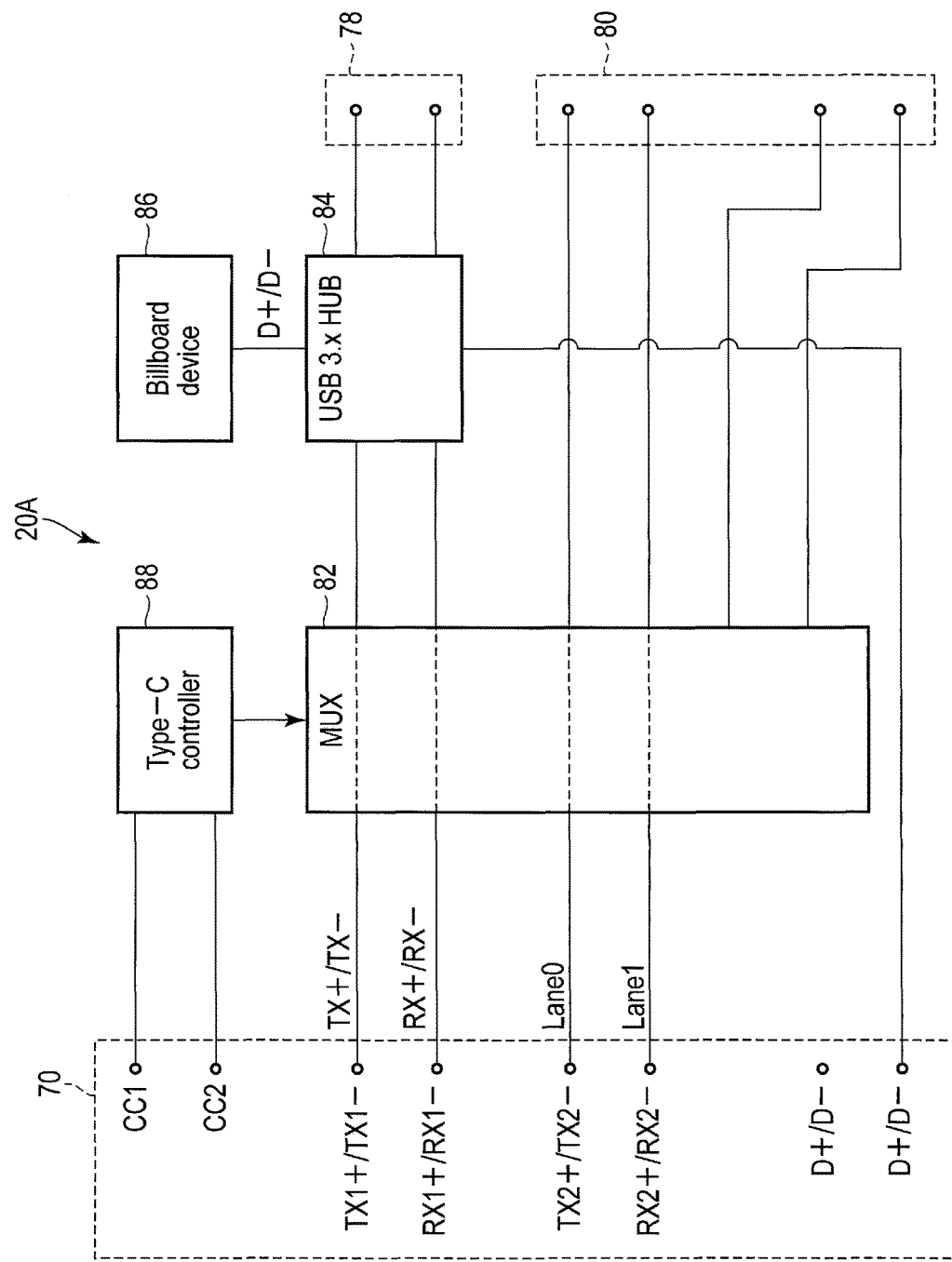
F I G. 4B

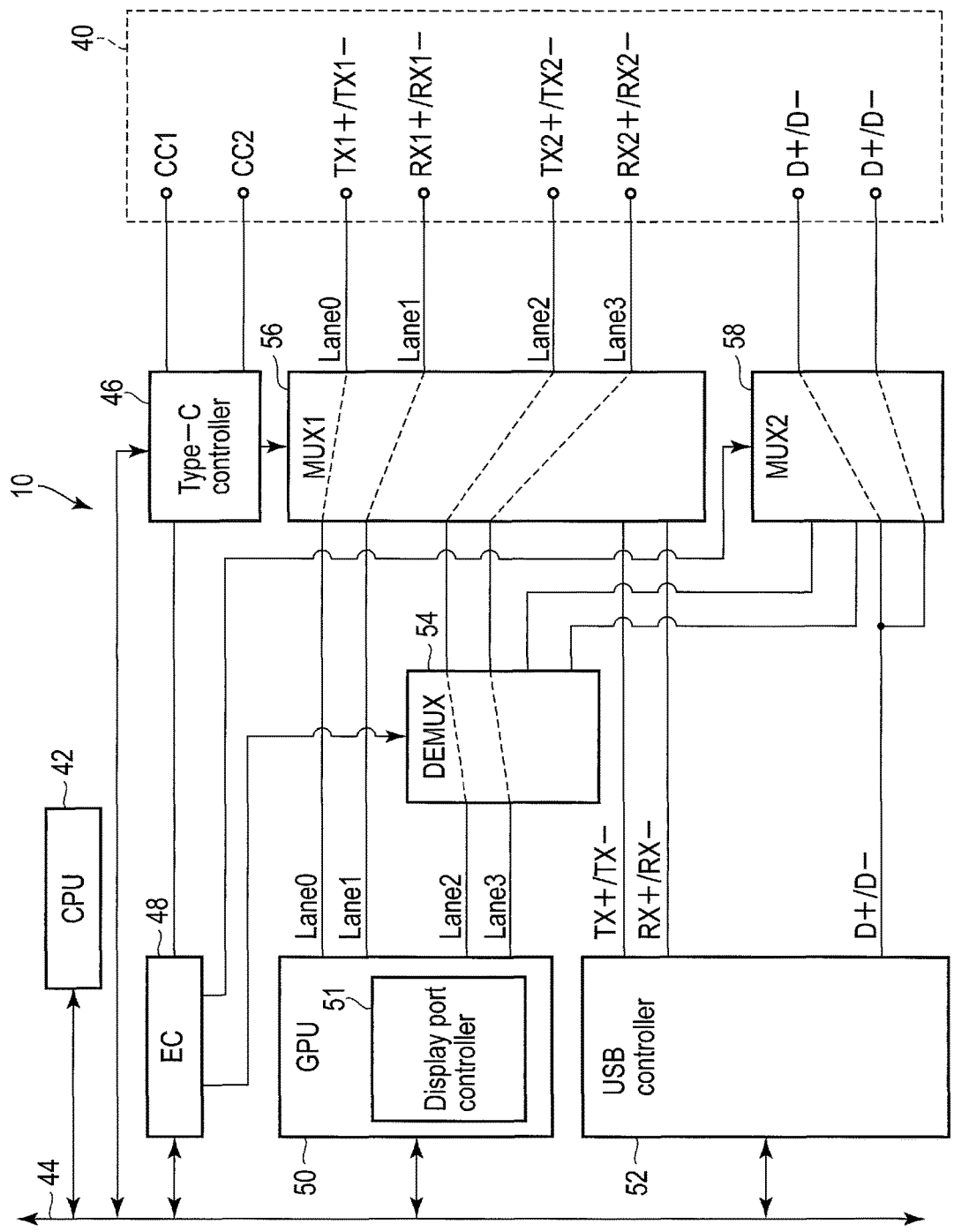
F I G. 5A

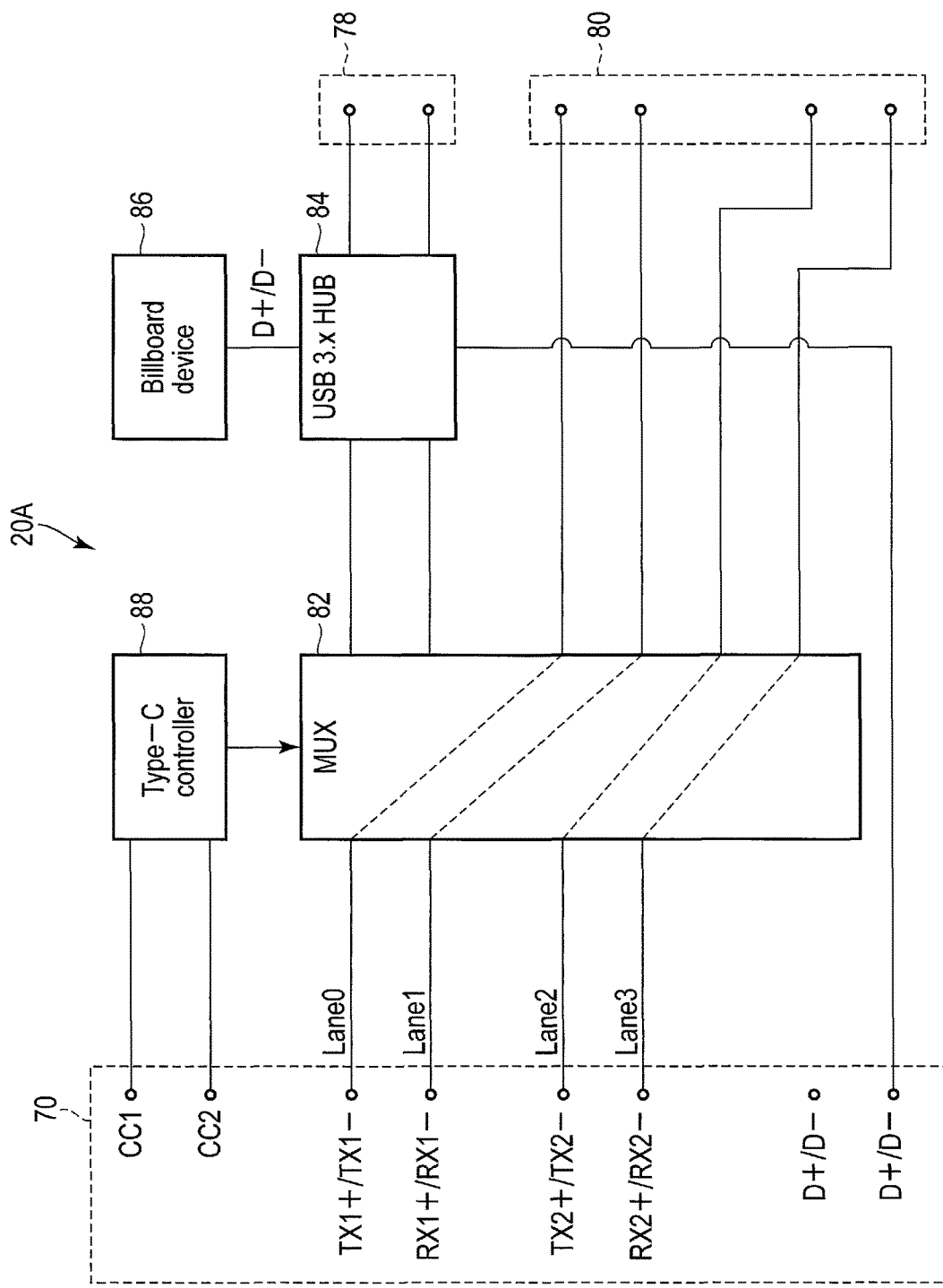
F I G. 5B

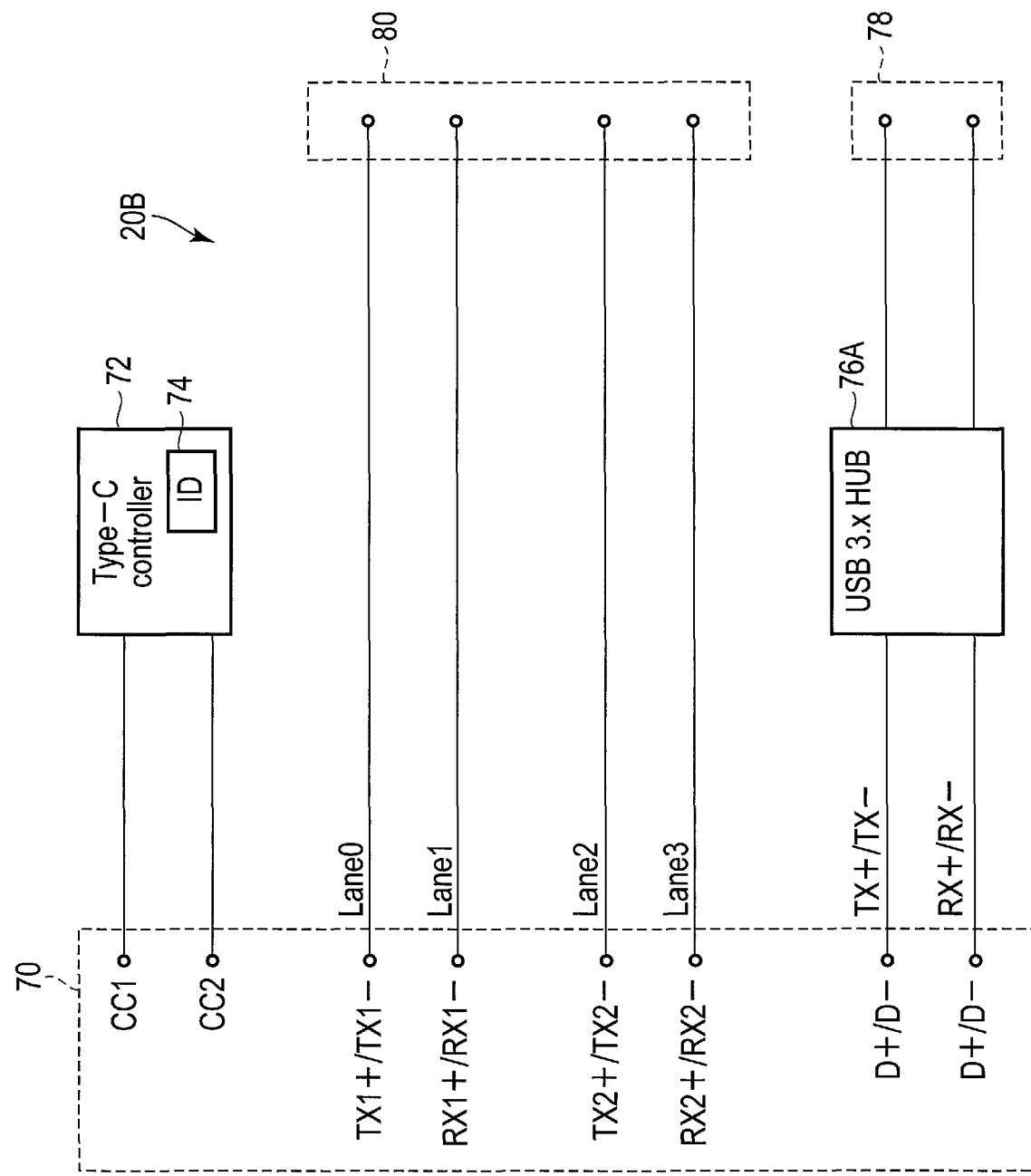
F I G. 7B

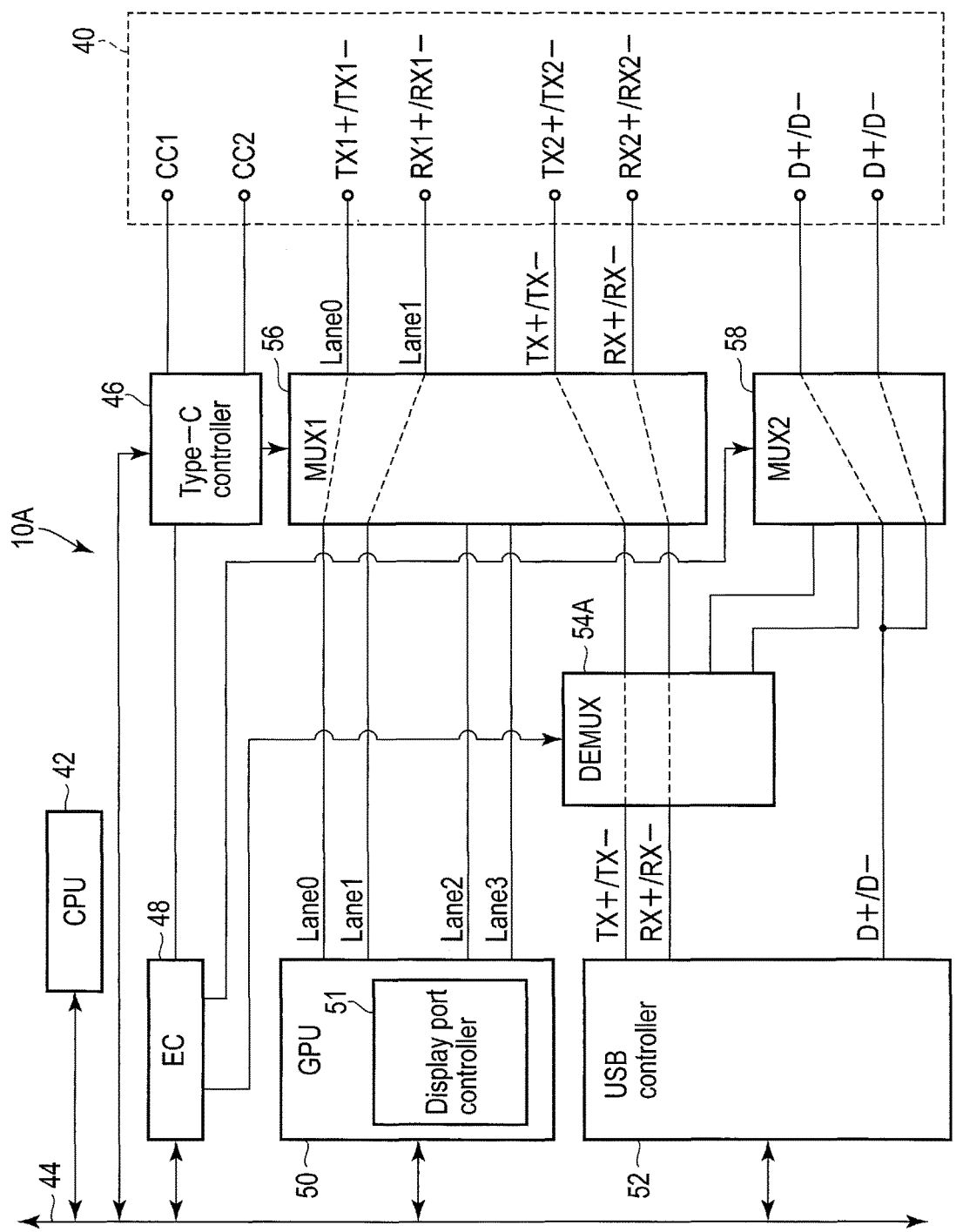
F I G. 9A

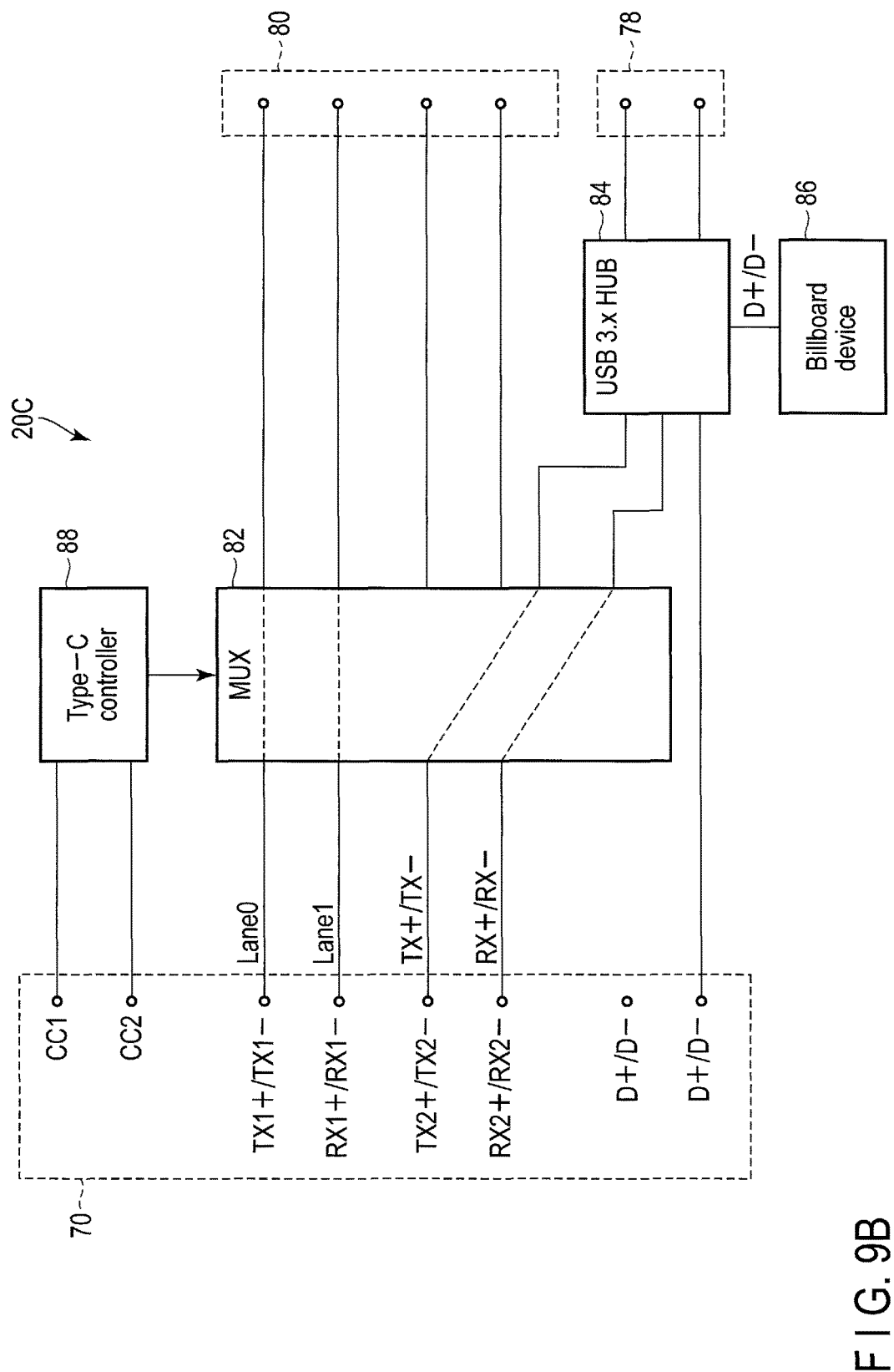
F I G. 9B

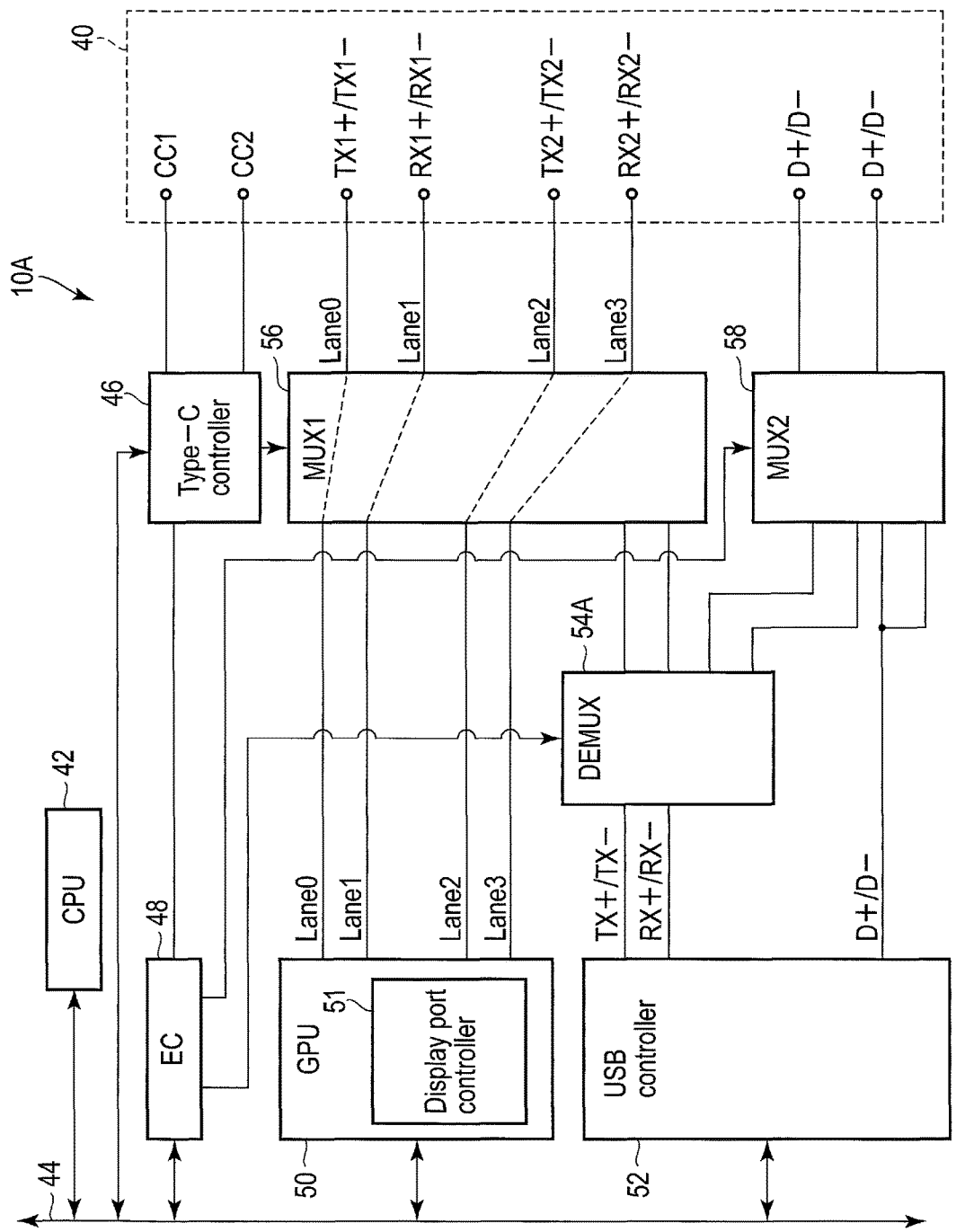
F I G. 10A

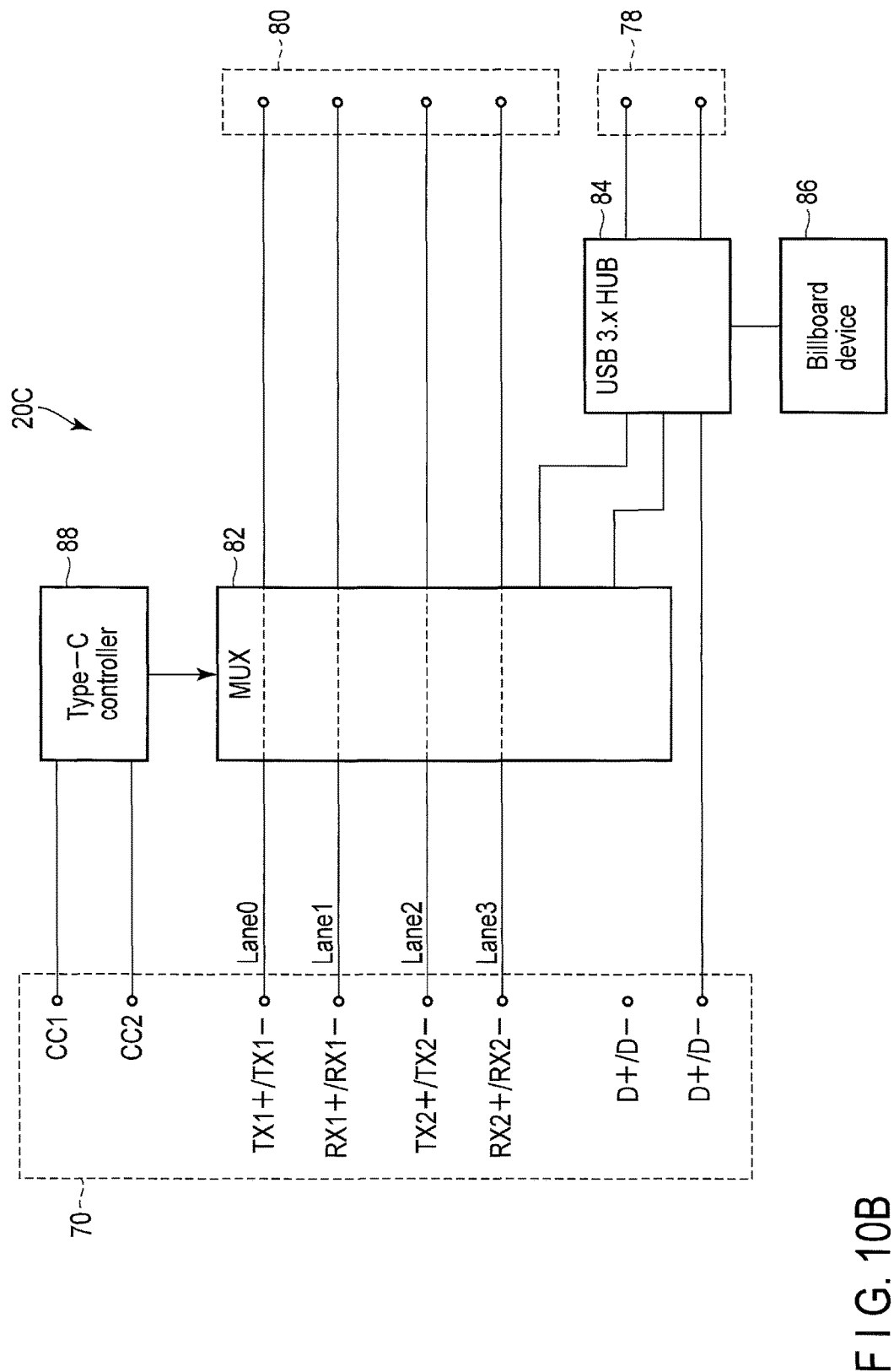
F I G. 10B

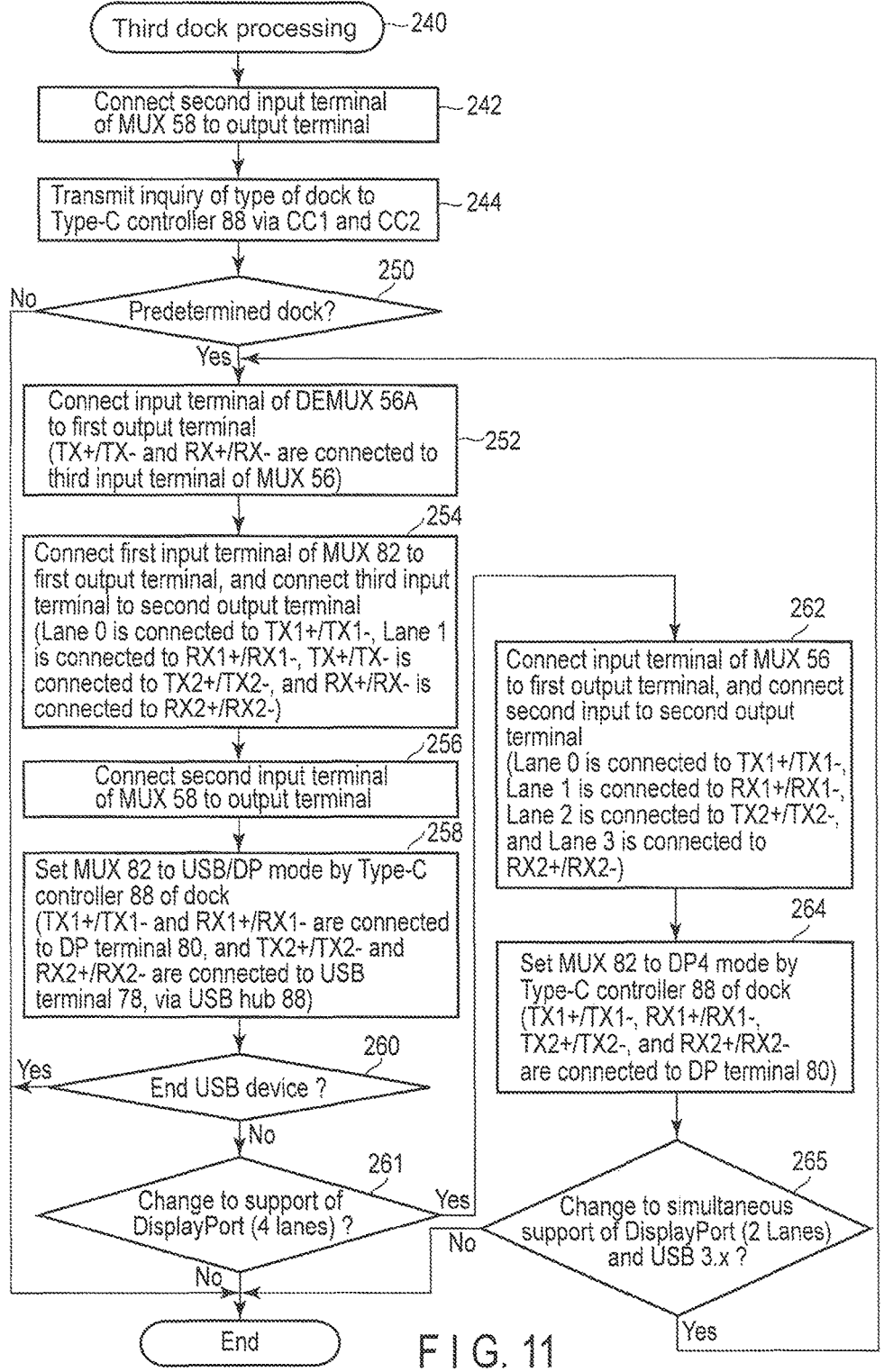
F I G. 11

USING A STANDARD USB TYPE-C CONNECTOR TO COMMUNICATE BOTH USB 3.X AND DISPLAYPORT DATA

CROSS-REFERENCE TO RELATED APPLICATIONS

This application claims the benefit of U.S. Provisional Application No. 62/275,746, filed Jan. 6, 2016, the entire contents of which are incorporated herein by reference.

FIELD

Embodiments described herein relate generally to connection between electronic devices.

BACKGROUND

One of examples of interfaces for connection between electronic devices is universal serial bus (USB) 3.1 standard. The standard includes USB Type-C Cable and Connector Specification (hereinafter called Type-C standard). A host or a device supports an alternate mode (or alternative mode) such as repurposing the connector for docking-specific applications, under USB Type-C standard. In the alternate mode, several pins of USB Type-C connector can be reconfigured, and it is examined that display signals, for example, DisplayPort (registered trademark) signals are assigned to several pins of USB Type-C connector. A USB dock capable of simultaneously supporting DisplayPort standard and USB 3.0/3.1 (hereinafter called USB 3.x) standard is thereby implemented.

However, the maximum bit rate is 21.6 Gbps with signal lines of four lanes (four sets) under DisplayPort standard, but the USB dock cannot simultaneously receive USB 3.x signals and DisplayPort signals of four lanes, and can receive only DisplayPort signals of two lanes (lane 0 and lane 1) together with USB 3.x signal.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2A is an exemplary circuit block diagram showing a PC of a first embodiment.

FIG. 4A is an exemplary circuit block diagram showing the PC of the first embodiment connected to a second USB dock different from the USB dock of the first embodiment.

FIG. 4B is an exemplary circuit block diagram showing the second USB dock connected to the PC shown in FIG. 4A.

FIG. 5A is an exemplary circuit block diagram showing another example of the PC of the first embodiment connected to the second USB dock.

FIG. 5B is an exemplary circuit block diagram showing another example of the second USB dock connected to the PC shown in FIG. 5A.

FIG. 7B is an exemplary circuit block diagram showing a USB dock of the second embodiment.

FIG. 9A is an exemplary circuit block diagram showing an example of the PC of the second embodiment connected to the second USB dock.

FIG. 9B is an exemplary circuit block diagram showing the second USB dock connected to the PC shown in FIG. 9A.

FIG. 10A is an exemplary circuit block diagram showing another example of the PC of the second embodiment connected to the second USB dock.

FIG. 10B is an exemplary circuit block diagram showing another example of the second USB dock connected to the PC shown in FIG. 10A.

FIG. 11 is an exemplary flowchart showing an operation of the PC of the second embodiment connected to the second USB dock.

DETAILED DESCRIPTION

Various embodiments will be described hereinafter with reference to the accompanying drawings.

In general, according to one embodiment, an electronic device includes a USB Type-C connector, a processor, and a USB controller. The USB Type-C connector is connectable to a second electronic device and includes two USB 2.0 pins D and D defined under USB Type-C standard and four USB 3.x pins TX1, RX1, TX2 and RX2 defined under the USB Type-C standard. The processor is connected to the USB Type-C connector and includes four terminals outputting an image signal. The USB controller is connected to the USB Type-C connector and includes two terminals outputting USB 3.x signal. The image signal and the USB 3.x signal are output via the two USB 2.0 pins D and D and the four USB 3.x pins TX1, RX1, TX2 and RX2.

Figure 1A:
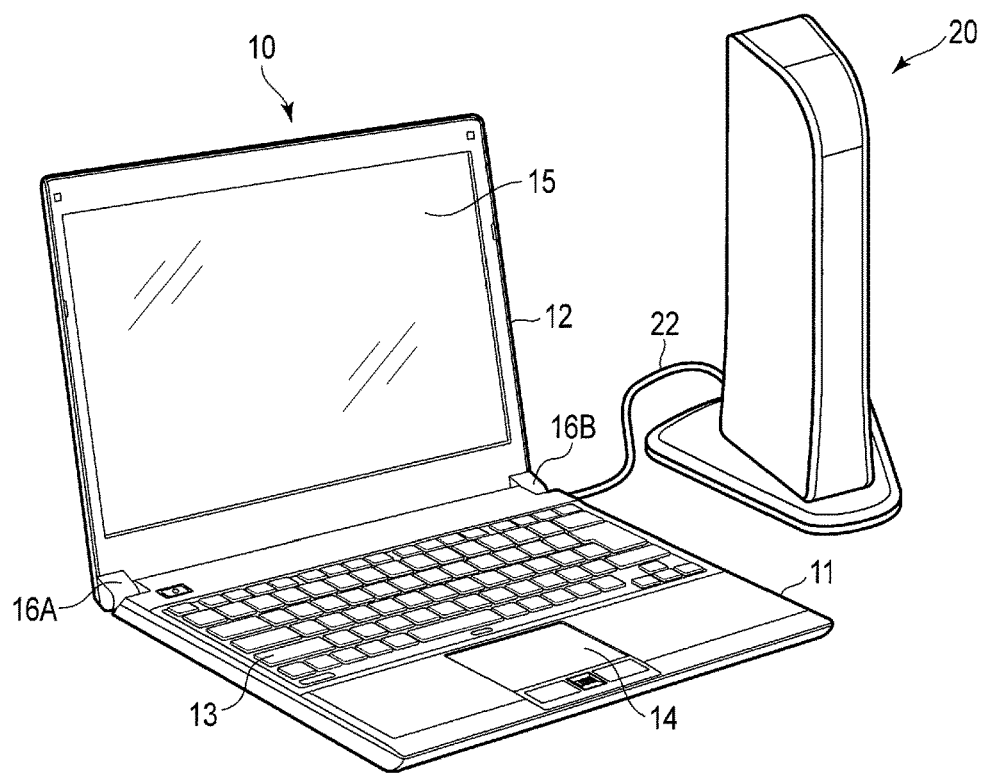
FIG. 1A is an exemplary illustration showing a connection between a PC and a USB dock according to one of embodiments.

FIG. 1A shows an example of a system configuration of embodiments. A notebook-type personal computer (hereinafter called PC) 10 and a tower-type USB dock 20 are connected by a USB Type-C cable 22. The PC 10 is also called a host, and the USB dock 20 is also called a device. The PC is not limited to the notebook type, but may also be a slate type or tablet type. The PC 10 includes a body 11 and a display unit 12. The display unit 12 includes a liquid crystal display (LCD) 15. The display unit 12 is attached to the body 11 so as to be rotatable by hinges 16A and 16B, and an opened position at which a top surface of the body 11 is exposed and a closed position at which the top surface of the body 11 is covered are changed. The body 11 has a housing shaped in a thin box, and a keyboard 13, a touchpad 14 and the like are arranged on the top surface of the housing. Various connectors are provided on a back surface of the USB dock 20 together with a connector connected to the cable 22. Various connectors include a USE connector, a DisplayPort connector, a LAN connector, an HDMI connector, a DVI connector, an audio output connector, a DC input connector connected to an AC adapter, and the like.

Figure 1B:
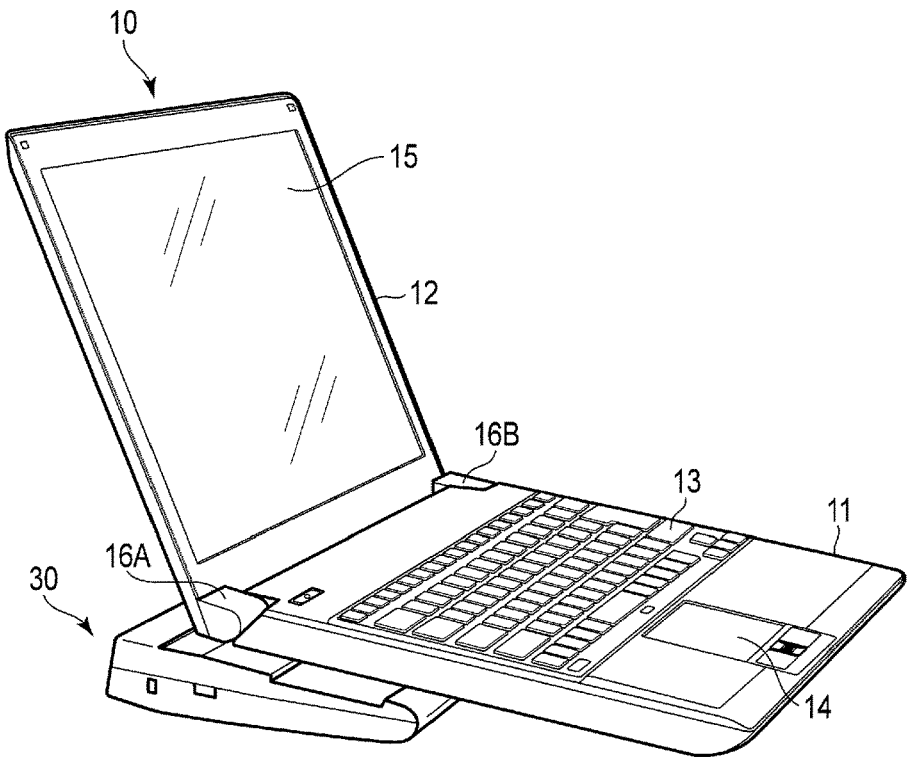
FIG. 1B is an exemplary illustration showing a connection between a PC and a USB dock according to one of embodiments.

The connection between the PC 10 and the USE dock 20 is not limited to the connection using the cable 22, but the PC10 may be placed on a slate-shaped USB dock 30 to make direct connection between the PC 10 and the USB dock as shown in FIG. 1B. A receptacle is disposed on an upper surface of the USB dock 30 while a plug is disposed on a lower surface of the PC 10 or a plug is disposed on an upper surface of the USB dock 30 while a receptacle is disposed on a lower surface of the PC 10, though not illustrated.

Figure 2B:
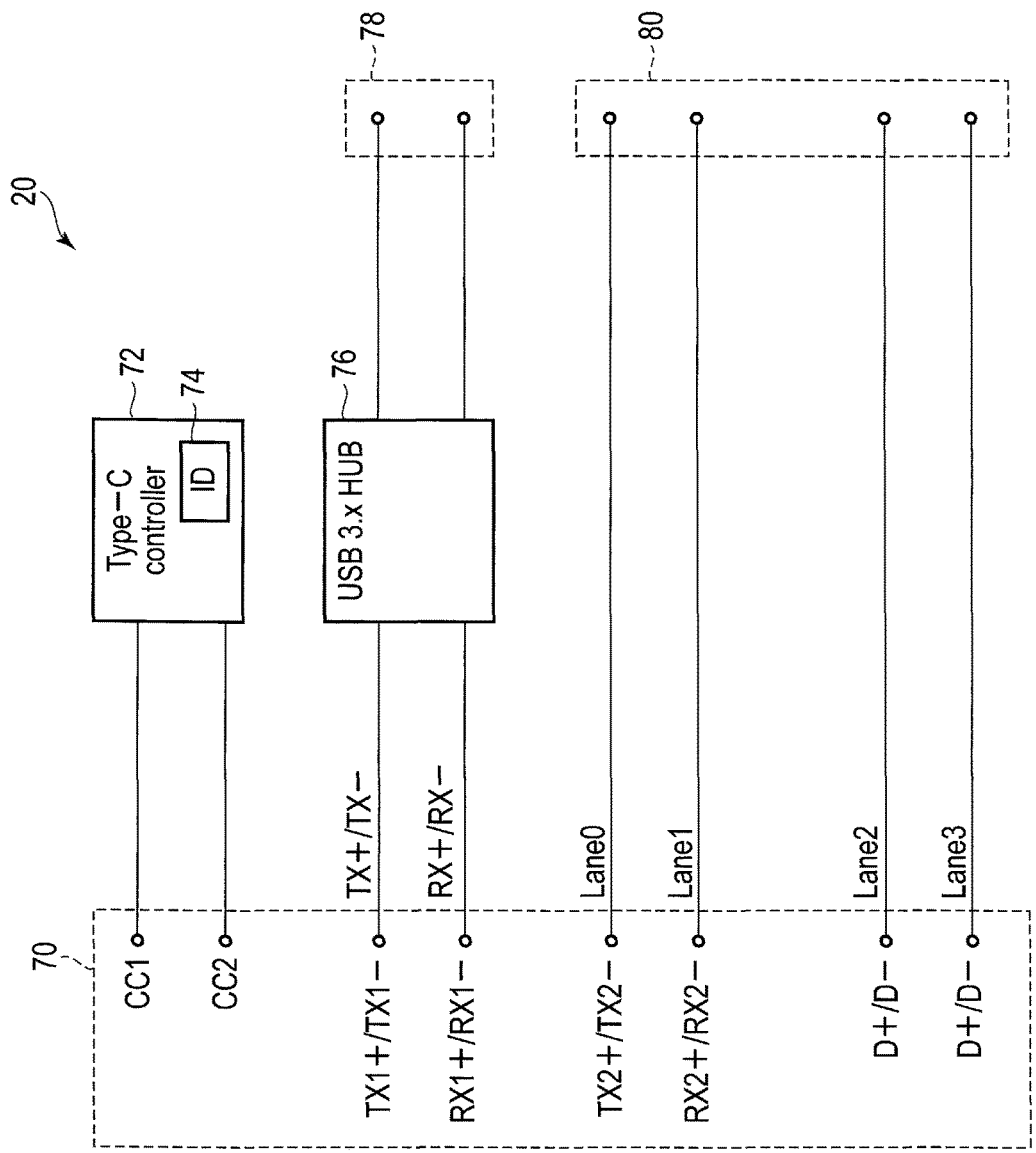
FIG. 2B is an exemplary circuit block diagram showing a USB dock of the first embodiment.

Electric configuration of the PC 10 and the USE dock 20 (or 30, hereinafter 20), of the first embodiment, will be described with reference to FIG. 2A and FIG. 2B. The PC 10 includes a USB Type-C receptacle 40 as shown in FIG. 2A, and the USB dock 20 includes a USB Type-C plug 70 as shown in FIG. 2B. The receptacle 40 and the plug 70 are hereinafter called connectors.

The USB Type-C connectors include two USB 2.0 data bus pins D+/D− and D+/D−, four USB 3.x data bus pins TX1+/TX1−, TX2+/TX2−, RX1+/RX1− and RX2+/RX2−, a USB power pin VBUS, a ground pin GND, two configuration channel pins CC1 and CC2, and a sideband use pin SBU. Each of the data bus pins D+/D−, D+/D−, TX1+/TX1−, TX2+/TX2−, RX1+/RX1− and RX2+/RX2− is a pin which delivers the differential signal. The USB power pin VBUS, the ground pin GND, and the sideband use pin SBU are not illustrated since these pins are not directly related to the operations of the embodiment.

As shown in FIG. 2A, the PC 10 includes at least a CPU 42, a Type-C controller 46, an embedded controller (hereinafter EC) 48, a GPU 50, a USB controller 52, a demultiplexer 54, first and second multiplexers 56 and 58, and the receptacle 40, in relation to the connection with the USB dock. General PC constituent elements, for example, a keyboard controller, a power supply controller and the like are not illustrated since they are not directly related to the operations of the embodiment.

The Type-C controller 46 carries out communications with a Type-C controller in the USB dock 20 which will be explained later, and determines whether the USB dock 20 is the dock according to the present embodiment or not. The EC 48 controls distribution of the demultiplexer 54 and selection of the second multiplexer 58 under control of the Type-C controller 46. The Type-C controller 46 controls selection of the first multiplexer 56. The Type-C controller 46 and the EC 48 may not be provided as separate bodies, but the Type-C controller 46 or the EC 48 may control the demultiplexer 54 and the second multiplexer 58. The GPU 50 which processes a video signal includes a DisplayPort controller 51 which outputs DisplayPort signal. The Type-C controller 46, the EC 48, the GPU 50, and the USB controller 52 are connected to a bus line 44 of the CPU 42. The USE controller 52 includes terminals TX+/TX− and RX+/RX− for USB 3.x data (differential signals), and a terminal D+/D− for USB2.0 data (a differential signal).

The DP controller 51 outputs DisplayPort signals (differential signals) of four lanes (four sets). The DisplayPort signals of lane 0 and lane 1 are input to a first input terminal group (two terminals) of the first multiplexer 56. The DisplayPort signals of lane 2 and lane 3 are input to an input terminal group (two terminals) of the demultiplexer 54. The demultiplexer 54 distributes an input to either of two outputs, a first output terminal group (two terminals) is connected to a second input terminal group (two terminals) of the first multiplexer 56, and a second output terminal group (two terminals) is connected to a first input terminal group (two terminals) of the second multiplexer 58.

In the first multiplexer 56, two of three inputs are selected as two outputs, and two terminals TX+/TX− and RX+/RX− of the USB controller 52 are connected to a third input terminal group (two terminals). A first output terminal group of the multiplexer 56 is connected to two pins TX1+/TX1− and RX1+/RX1− of the receptacle 40, and a second output terminal group of the first multiplexer 56 is connected to two pins TX2+/TX2− and RX2+/RX2− of the receptacle 40.

The second multiplexer 58 selects either of two inputs, and the terminal D+/D− of the USB controller 52 is commonly connected to the second input terminal group (two terminals). An output terminal group of the second multiplexer 58 is connected to two pins D+/D− and D+/D− of the receptacle 40.

As shown in FIG. 2B, the USB dock 20 includes at least a Type-C controller 72, a USB 3.x hub 76 and a plug 70 in relation to the connection with the PC 10. The USB dock 20 may be supplied with the power from the PC 10 or may include an original power source. If the USB dock 20 includes a power source, the USB dock 20 may supply the power to the PC 10. An ID indicating a type is defined for the USB dock, and the Type-C controller 72 includes a memory 74 which stores the ID. Two pins TX1+/TX1− and RX1+/RX1− of the plug 70 are connected to two input terminals of the USB 3.x hub 76.

The USB dock 20 includes a DisplayPort terminal group 80 having four terminals and a USB 3.x terminal group 78 having two terminals as output terminals. Each of the terminals delivers the differential signal. Four pins TX2+/TX2−, RX2+/RX2−, D+/D−, and D+/D− of the plug 70 are connected to four pins of the DisplayPort pin group 80, respectively. Two output terminals of the USB 3.x hub 76 are connected to two pins of the USB 3.x pin group 78, respectively.

Figure 3:
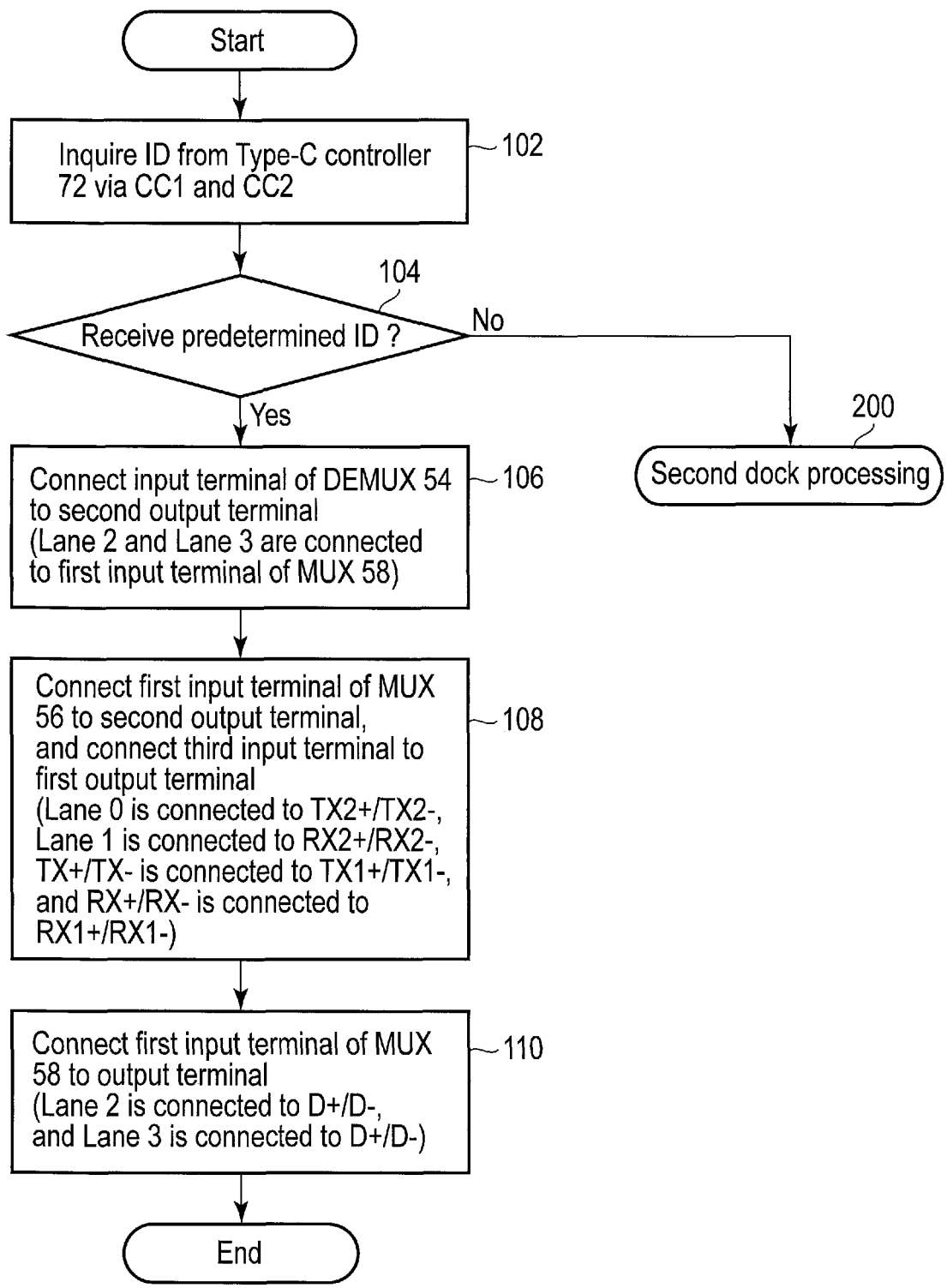
FIG. 3 is an exemplary flowchart showing an operation of the PC of the first embodiment.

FIG. 3 is a flowchart showing an operation of the PC 10 shown in FIG. 2A. The PC 10 is assumed to be connected to the USB dock 20 shown in FIG. 2B but may be connected to the other dock. If the PC 10 detects the connection of the dock, the Type-C controller 46 inquires the ID from the Type-C controller 72 of the USB dock 20 via the pins CC1 and CC2 in block 102. The Type-C controller 72 sends the ID stored in the memory 74 to the Type-C controller 46 of the PC 10.

The Type-C controller 46 determines whether a predetermined ID has been received or not, in block 104. If the connected USB dock is other than the dock of the type shown in FIG. 2B, the determination result in block 104 is NO since a predetermined ID is not sent, and a second dock processing which will be explained later will be performed in block 200. If the connected USB dock is the dock of the type shown in FIG. 2B, the determination result in block 104 is YES since a predetermined ID is sent, and steps following block 106 are performed.

If the Type-C controller 46 receives the predetermined ID, the EC 48 sets connection of the input and output of the demultiplexer 54 as shown in FIG. 2A, in block 106. In other words, the input terminal group of the demultiplexer 54 is connected to the second output terminal group. For this reason, the DisplayPort signals of lane 2 and lane 3 are input to the first input terminal group of the second multiplexer 58.

In block 108, the Type-C controller 46 sets connection of the input and output of the first multiplexer 56 as shown in FIG. 2A. In other words, the first input terminal group of the first multiplexer 56 is connected to the second output terminal group, and the third input terminal group of the first multiplexer 56 is connected to the first output terminal group. For this reason, the DisplayPort signals of lane 0 and lane 1 are supplied to two pins TX2+/TX2− and RX2+/RX2− of the receptacle 40, and two terminals TX+/TX− and RX+/RX− of the USB controller 52 are connected to two pins TX1+/TX1− and RX1+/RX1− of the receptacle 40, respectively.

In block 110, the EC 48 changes connection of the input and output of the second multiplexer 58 as shown in FIG. 2A. In other words, the first input terminal group of the second multiplexer 58 is connected to the output terminal group. For this reason, the DisplayPort signals of lane 2 and lane 3 are supplied to two pins D+/D− and D+/D− of the receptacle 40.

For this reason, the DisplayPort signals of lane 0, lane 1, lane 2 and lane 3 are supplied to four pins of the DisplayPort pin group 80, two terminals TX+/TX− and RX+/RX− of the USB controller 52 are connected to the USB 3.x pin group 78. The USB dock capable of simultaneously supporting DisplayPort standard (four lanes) and USB 3.x standard can be implemented.

Next, it will be described that the PC 10 (host) shown in FIG. 2A can also operate with a USB dock other than the USE dock 20 shown in FIG. 2B. FIG. 4A, FIG. 4B, FIG. 5A, and FIG. 5B show examples of a system configuration in a case where a USB dock 20A other than the USB dock 20 shown in FIG. 2B is connected to the PC 10 shown in FIG. 2A. The USB dock 20A is a dock which cannot simultaneously support DisplayPort standard (four lanes) and USE 3.x standard, but can change the support of DisplayPort standard (four lanes) alone and the simultaneous support of DisplayPort standard (two lanes) and USB 3.x standard. FIG. 4A and FIG. 4B show an example of simultaneously supporting DisplayPort standard (two lanes) and USB 3.x standard, and FIG. 5A and FIG. 5B show supporting DisplayPort standard (four lanes) alone.

A hardware configuration of the PC 10 shown in FIG. 4A and FIG. 5A is the same as that of the PC 10 shown in FIG. 2A, but different with respect to connection of the input and output of the demultiplexer 54 and the multiplexers 56 and 58. The USE dock 20A shown in FIG. 4B and FIG. 5B includes the DisplayPort pin group 80 of four lanes and the USB 3.x pin group 78, similarly to the USE dock 20 shown in FIG. 2B, and further includes a Type-C controller 88, a multiplexer 82, a billboard device 86 and a USB 3.x hub 84.

The billboard device 86 is connected to the USB 3.x hub 84. The device includes the billboard device 86 to notify for the host that when the device is connected to a host which does not support an alternate mode of USB Type-C standard, the device can be operated under USB standard only. The USB dock of the embodiment shown in FIG. 2B does not include a billboard device since the USB dock is assumed to be connected to the host which supports an alternate mode of USB Type-C standard. However, the USB dock 20 shown in FIG. 2B includes the ID memory 74 in the Type-C controller 72. The USB dock shown in FIG. 4B and FIG. 5B includes the billboard device since the USB dock may also be connected to a host which does not support an alternate mode of USB Type-C standard. For this reason, the Type-C controller 88 does not include the ID memory. The billboard device 86 sends information for identifying the device to the host when the billboard device 86 receives the inquiry of the type of the device from the host via the pin D+/D−.

Two pins TX1+/TX1− and RX1+/RX1− of the plug 70 are connected to the first input terminal group (two terminals) of the multiplexer 82, and two pins TX2+/TX2− and RX2+/RX2− of the plug 70 are connected to the second input terminal group (two terminals) of the multiplexer 82. In the multiplexer 82, two input terminal groups are selectively connected to three output terminal groups. The first output terminal group (two terminals) of the multiplexer 82 is connected to each of two input terminals of the USB 3.x hub 84, and the second output terminal group (two terminals) and the third output terminal group (two terminals) of the multiplexer 82 are connected to four pins of the DisplayPort pin group 80 of four lanes, respectively.

The system operation shown in FIG. 4A, FIG. 4B, FIG. 5A, and FIG. 5B will be explained with reference to a flowchart of FIG. 6. An example of changing operation to simultaneously support DisplayPort standard (two lanes) and USB 3.x standard and then support DisplayPort standard (four lanes) alone will be explained, but the operation may be changed to support DisplayPort standard (four lanes) alone and then simultaneously support DisplayPort standard (two lanes) and USB 3.x standard.

Figure 6:
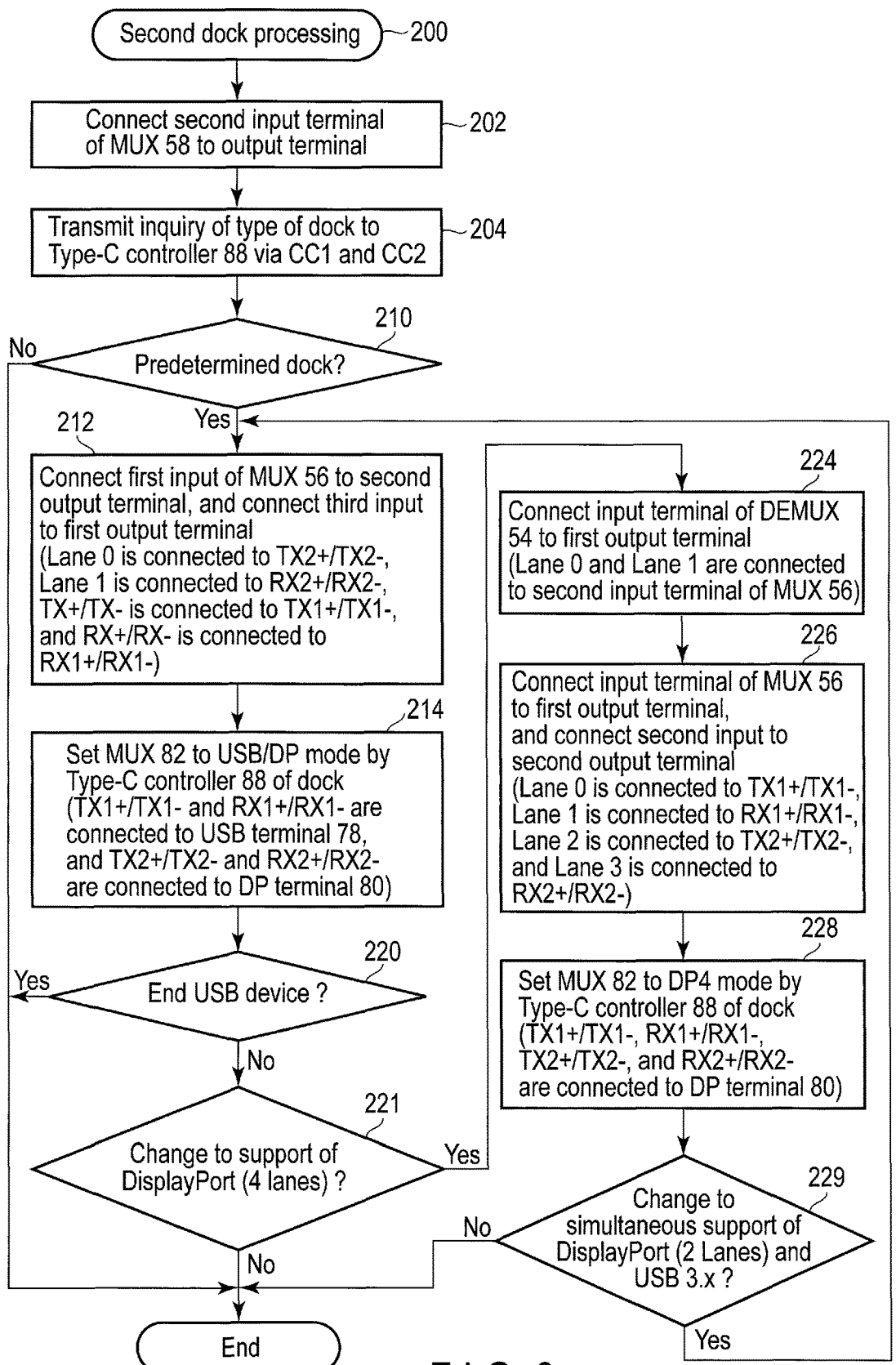
FIG. 6 is an exemplary flowchart showing an operation of the PC of the first embodiment connected to the second USB dock.

FIG. 6 is a flowchart of second dock processing 200 shown in FIG. 3. In block 202, the EC 48 sets connection of the input and output of the second multiplexer 58 as shown in FIG. 4A. In other words, the second input terminal group of the second multiplexer 58 is connected to the output terminal group. For this reason, the D+/D− terminal of the USB controller 52 is commonly connected to two pins D+/D− and D+/D− of the receptacle 40.

In block 204, the Type-C controller 46 sends an inquiry to the Type-C controller 88 of the USB dock 20A via the pins CC1 and CC2 as to whether the USB dock 20A is the predetermined dock or not. The Type-C controller 88 stores information indicating the type of the dock. The predetermined dock indicates a dock shown in FIG. 4B and FIG. 5B, which cannot simultaneously support DisplayPort standard (four lanes) and USB 3.x standard, but can change the support of DisplayPort standard (four lanes) alone and the simultaneous support of DisplayPort standard (two lanes) and USB 3.x standard.

In block 210, the USB controller 52 determines whether the USB dock 20A is the predetermined dock or not. If the USB dock 20A is not the predetermined dock, the USE controller 52 displays an error message and ends processing.

If the USB dock 20A is the predetermined dock, the Type-C controller 46 sets connection of the input and output of the first multiplexer 56 as shown in FIG. 4A, in block 212. In other words, the first input terminal group of the first multiplexer 56 is connected to the second output terminal group, and a third input terminal group of the first multiplexer 56 is connected to the first output terminal group. Thus, the DisplayPort signals of lane 0 and lane 1 are supplied to two pins TX2+/TX2− and RX2+/RX2− of the receptacle 40, and terminals TX+/TX− and RX+/RX− of the USB controller 52 are connected to two pins TX1+/TX1− and RX1+/RX1− of the receptacle 40, respectively. Since the output of the demultiplexer 54 is not used as explained later, the connection of the input and output of the demultiplexer 54 does not need to be controlled.

In block 214, the CPU 42 sets connection of the input and output of the multiplexer 82 by the Type-C controller 88 in the USB dock 20A, as shown in FIG. 4B. In other words, the first input terminal group of the multiplexer 82 is connected to the first output terminal group, and the second input terminal group of the multiplexer 82 is connected to the second output terminal group. Thus, the terminals TX+/TX− and RX+/RX− of the USB controller 52 are connected to the USB 3.x pin group 78 via the USB 3.x hub 84, and the DisplayPort signals of lane 0 and lane 1 are connected to two pins of the DisplayPort pin group 80. As a result, the PC 10 of the embodiment can also be connected to the USB dock 20A other than the USB dock 20 shown in FIG. 2B and capable of simultaneously supporting DisplayPort standard (two lanes) and USB 3.x standard.

The USB dock 20A can thus simultaneously support DisplayPort standard (two lanes) and USB 3.x standard. After that, when the operation of the USB device is ended, the USE dock 20A can support DisplayPort standard (four lanes) alone.

In block 220 in FIG. 6, the CPU 42 determines whether the operation of the USB device connected to the USB 3.x pin group 78 has been ended or not. When the CPU 42 detects the end of operation, the CPU 42 displays on a display (not shown) a message indicating whether the simultaneous support of DisplayPort standard (two lanes) and USB 3.x standard will be changed to the support of DisplayPort standard (four lanes) or not. If the user wishes the change, the user inputs an instruction for change by an input device (not shown). In block 221, the CPU 42 determines whether the user has input the instruction for change or not and, if the user has not, the CPU 42 ends the operation.

If the user has input the instruction for change, the EC 48 sets connection of the input and output of the demultiplexer 54 as shown in FIG. 5A, in block 224. In other words, the input terminal group of the demultiplexer 54 is connected to the first output terminal group. The DisplayPort signals of lane 2 and lane 3 are thereby supplied to two terminals of the second input terminal group of the first multiplexer 56, respectively.

In block 226, the Type-C controller 46 sets connection of the input and output of the first multiplexer 56 as shown in FIG. 5A. In other words, the first input terminal group of the first multiplexer 56 is connected to the first output terminal group, and the second input terminal group of the first multiplexer 56 is connected to the second output terminal group. Thus, the DisplayPort signals of lane 0, lane 1, lane 2 and lane 3 are supplied to four pins TX1+/TX1−, RX1+/RX1−, TX2+/TX2− and RX2+/RX2− of the receptacle 40, respectively.

In block 228, the CPU 42 sets connection of the input and output of the multiplexer 82 by the Type-C controller 88 in the USB dock 20A, as shown in FIG. 5B. In other words, the first input terminal group of the multiplexer 82 is connected to the second output terminal group, and the second input terminal group of the multiplexer 82 is connected to the third output terminal group. The DisplayPort signals of lane 0, lane 1, lane 2 and lane 3 are thereby connected to four pins of the DisplayPort pin group 80, respectively. As a result, the USB dock 20A can support DisplayPort standard (four lanes).

After that, the CPU 42 displays on a display (not shown) a message indicating whether the support of DisplayPort standard (four lanes) will be changed to the simultaneous support of DisplayPort standard (two lanes) and USB 3.x standard or not. If the user wishes the change, the user inputs an instruction for change by an input device (not shown). In block 229, the CPU 42 determines whether the user has input the instruction for change or not and, if the user has not, the CPU 42 ends the operation.

If the user has input the instruction for change, the processing of block 212 is performed again.

According to the first embodiment, the USE dock capable of simultaneously supporting DisplayPort standard (four lanes) and USB 3.x standard can be thus implemented. Furthermore, the host capable of using the USB dock can also use the other USB dock, for example, the USB dock capable of simultaneously supporting DisplayPort standard (two lanes) and USB 3.x standard or supporting DisplayPort standard (four lanes).

Next, the second embodiment will be described.

Figure 7A:
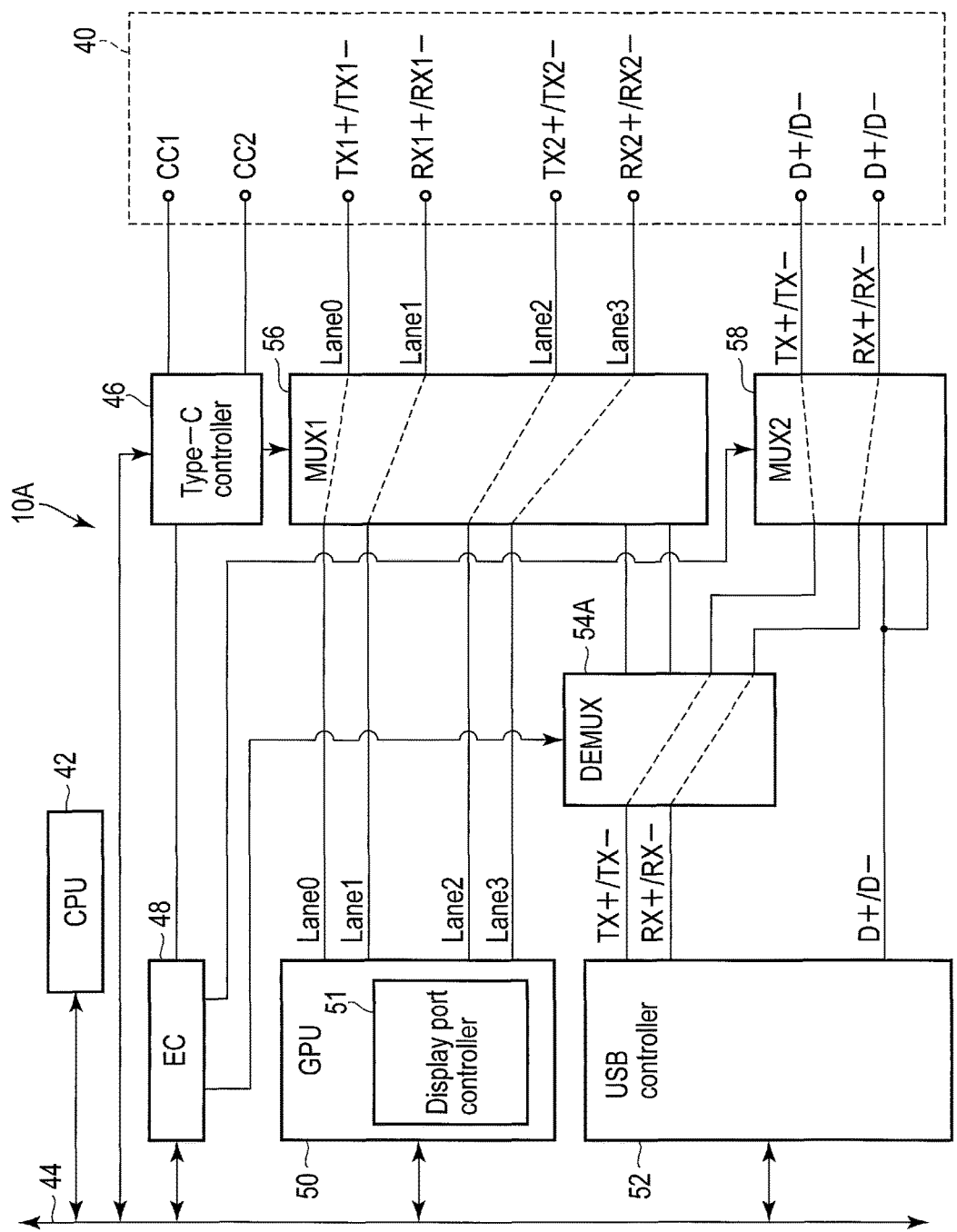
FIG. 7A is an exemplary circuit block diagram showing a PC of a second embodiment.

FIG. 7A shows a PC 10A of the second embodiment. Constituent elements of the PC 10A are the same as those of the first embodiment, but different with respect to connection of input and output of a demultiplexer 54A. According to the first embodiment, as shown in FIG. 2A, the DisplayPort signals of lane 2 and lane 3 output from the GPU 50 are connected to the input terminal group of the multiplexer 54 but, according to the second embodiment, as shown in FIG. 7A, two terminals TX+/TX− and RX+/RX− of the USB controller 52 are connected to the input terminal group of the demultiplexer 54A. In other words, the DisplayPort signals of lane 0 and lane 1 output from the GPU 50 are input to the first input terminal group of the first multiplexer 56, and the DisplayPort signals of lane 2 and lane 3 output from the GPU 50 are input to the second input terminal group of the first multiplexer 56. The first output terminal group of the first multiplexer 56 is connected to two pins TX1+/TX1− and RX1+/RX1− of the receptacle 40, and the second output terminal group of the first multiplexer 56 is connected to two pins TX2+/TX2− and RX2+/RX2− of the receptacle 40. The output terminal group of the second multiplexer 58 is connected to two pins D+/D− and D+/D− of the receptacle 40.

FIG. 7B shows a USB dock 20B of the second embodiment. Constituent elements of the USB dock 20B are the same as those of the first embodiment, but different with respect to a connection portion of a USB 3.x hub 76A. According to the first embodiment, as shown in FIG. 2B, two pins TX1+/TX1− and RX1+/RX1− of the plug 70 are connected to the input terminal group of the USB 3.x hub 76 but, according to the second embodiment, as shown in FIG. 7B, two pins D+/D− and D+/D− of the plug 70 are connected to an input terminal group of the USB 3.x hub 76A. In other words, four pins TX1+/TX1−, RX1+/RX1−, TX2+/TX2−, and RX2+/RX2− of the plug 70 are connected to the DisplayPort pin group 80 four lanes, and two pins D+/D− and D+/D− of the plug 70 are connected to the two pins of the USB 3.x pin group 78 via the USB 3.x hub 76A.

Figure 8:
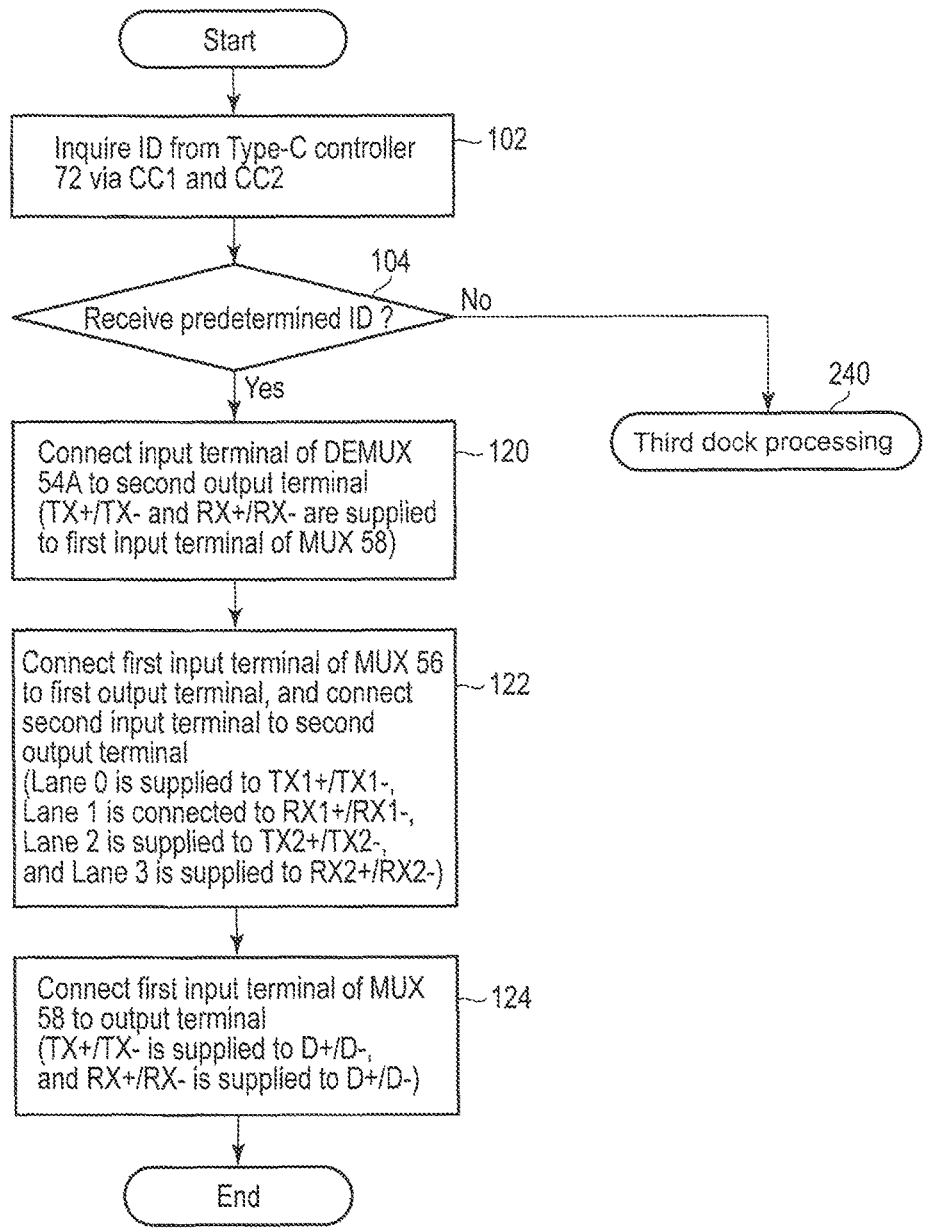
FIG. 8 is an exemplary flowchart showing an operation of the PC of the second embodiment.

FIG. 8 is a flowchart showing operations of the PC 10A shown in FIG. 7A. Blocks of performing the same operations as those in FIG. 3 are denoted by the same block numbers. If the PC 10A detects connection of the dock, the Type-C controller 46 inquires the ID from the Type-C controller 72 of the USB dock 20B via pins CC1 and CC2 in block 102. The Type-C controller 46 determines whether the predetermined ID has been received or not, in block 104. If the connected dock is other than the dock shown in FIG. 7B, the determination result in block 104 is NO since the predetermined ID is not sent from the dock, and the third dock processing which will be explained later will be performed in block 240. If the connected dock is the dock of the type shown in FIG. 7B, the determination result in block 104 is YES since the predetermined ID is sent from the dock, and operations following block 120 are performed.

If the Type-C controller 46 receives the predetermined ID, the EC 48 changes connection of the input and output of the demultiplexer 54A, in block 120. In other words, the input terminal group of the demultiplexer 54A is connected to the second output terminal group. For this reason, two terminals TX+/TX− and RX+/RX− of the USB controller 52 are connected to the first input terminal group of the second multiplexer 58.

In block 122, the Type-C controller 46 changes connection of the input and output of the first multiplexer 56. In other words, the first input terminal group of the first multiplexer 56 is connected to the first output terminal group, and the second input terminal group of the first multiplexer 56 is connected to the second output terminal group. For this reason, the DisplayPort signals of lane 0, lane 1, lane 3 and lane 4 are connected to four pins TX1+/TX1−, RX1+/RX1−, TX2+/TX2− and RX2+/RX2− of the receptacle 40, respectively.

In block 124, the EC 48 sets connection of the input and output of the second multiplexer 58. In other words, the first input terminal group of the second multiplexer 58 is connected to the output terminal group. For this reason, two terminals TX+/TX− and RX+/RX− of the USB controller 52 are connected to two pins D+/D− and D+/D− of the receptacle 40, respectively.

As a result, the DisplayPort signals of lane 0, lane 1, lane 2 and lane 3 are supplied to four pins of the DisplayPort pin group 80, two terminals TX+/TX− and RX+/RX− of the USB controller 52 are connected to two pins of the USB 3.x pin group 78. The USB dock capable of simultaneously supporting DisplayPort standard (four lanes) and USB 3.x standard can be implemented.

Next, it will be described that the PC 10A (host) shown in FIG. 7A can also operate with a USB dock other than the USB dock 20B shown in FIG. 7B. FIG. 9A, FIG. 9B, FIG. 10A, and FIG. 10B show an example of a system configuration in a case where a USB dock 20C other than the USB dock 20B shown in FIG. 7B is connected to the PC 10A shown in FIG. 7A. The USB dock 20C is a dock which cannot simultaneously support DisplayPort standard (four lanes) and USB 3.x standard, but can change the support of DisplayPort standard (four lanes) alone and the simultaneous support of DisplayPort standard (two lanes) and USB 3.x standard, similarly to the USB dock 20B shown in FIG. 4B and FIG. 5B. FIG. 9A and FIG. 9B show an example of simultaneously supporting DisplayPort standard (two lanes) and USB 3.x standard, and FIG. 10A and FIG. 10B show supporting DisplayPort standard (four lanes) alone.

A hardware configuration of the PC 10A shown in FIG. 9A and FIG. 10A is the same as that of the PC 10A shown in FIG. 7A, but different with respect to connection of the input and output of the demultiplexer 54A and multiplexers 56 and 58. The USB dock 20C shown in FIG. 9B and FIG. 10B includes the DisplayPort pin group 80 of four lanes and the USB 3.x pin group 78, similarly to the USB dock 20B shown in FIG. 7B, and further includes the Type-C controller 88, multiplexer 82, billboard device 86 and USB 3.x hub 84.

The billboard device 86 is connected to the USB 3.x hub 84. The billboard device 86 sends information for identifying the device to the host when the billboard device 86 receives the inquiry of the type of the device from the host via the pin D+/D−. A billboard device is unnecessary in the USB dock 20B shown in FIG. 7B since the ID memory 74 is provided in the Type-C controller 72, but the USB dock 20C shown in FIG. 9B and FIG. 10B includes the billboard device 84 since an ID memory 74 is not provided in the USB dock 20C.

Four pins TX1+/TX1−, RX1+/RX1−, TX2+/TX2− and RX2+/RX2− of the plug 70 are connected to the first input terminal group (two terminals) and the second input terminal group (two terminals) of the multiplexer 82. In the multiplexer 82, two input terminal groups are selectively connected to three output terminal groups. The third output terminal group (two terminals) of the multiplexer 82 is connected to each of two input terminals of the USB 3.x hub 84. The first output terminal group (two terminals) and the second output terminal group (two terminals) of the multiplexer 82 are connected to four pins of the DisplayPort pin group 80 of four lanes, respectively.

The system operation shown in FIG. 9A, FIG. 9B, FIG. 10A, and FIG. 10B will be described with reference to FIG. 11. An example of changing operation to simultaneously support DisplayPort standard (two lanes) and USB 3.x standard and then support DisplayPort standard (four lanes) alone will be explained, but the operation may be changed to support DisplayPort standard (four lanes) alone and then simultaneously support DisplayPort standard (two lanes) and USB 3.x standard.

FIG. 11 is a flowchart of the third dock processing 240 shown in FIG. 8.

In block 242, the EC 48 changes connection of the input and output of the second multiplexer 58 as shown in FIG. 9A. In other words, the second input terminal group of the second multiplexer 58 is connected to the output terminal group. For this reason, the D+/D− terminal of the USB controller 52 is commonly connected to two pins D+/D− and D+/D− of the receptacle 40.

In block 244, the Type-C controller 46 inquires of the Type-C controller 88 of the USB dock 20C via the pins CC1 and CC2 whether the USB dock 20C is the predetermined dock or not. The Type-C controller 88 stores information indicating the type of the dock. The predetermined dock indicates the dock shown in FIG. 9B and FIG. 10B, which cannot simultaneously support DisplayPort standard (four lanes) and USB 3.x standard, but can change the support of DisplayPort standard (four lanes) alone and the simultaneous support of DisplayPort standard (two lanes) and USB 3.x standard.

In block 250, the USB controller 52 determines whether the USB dock 20C is the predetermined dock or not as shown in FIG. 9B and FIG. 10B. If the USB dock 20C is not the predetermined dock, the USB controller 52 displays an error message and ends processing.

If the USB dock 20C is the predetermined dock, the EC 48 sets connection of the input and output of the demultiplexer 54A as shown in FIG. 9A. In other words, the input terminal group of the demultiplexer 54A is connected to the first output terminal group. As a result, two terminals TX+/TX− and RX+/RX− of the USB controller 52 are connected to the third input terminal group of the first multiplexer 56.

In block 254, the Type-C controller 46 sets connection of the input and output of the first multiplexer 56 as shown in FIG. 9A. In other words, the first input terminal group of the first multiplexer 56 is connected to the first output terminal group, and the third input terminal group of the first multiplexer 56 is connected to the second output terminal group. Thus, the DisplayPort signals of lane 0 and lane 1 are supplied to two pins TX1+/TX1− and RX1+/RX1− of the receptacle 40, and terminals TX+/TX− and RX+/RX− of the USB controller 52 are connected to two pins TX2+/TX2− and RX2+/RX2− of the receptacle 40, respectively.

In block 256, the EC 48 sets connection of the input and output of the second multiplexer 58 as shown in FIG. 9A. In other words, the second input terminal group of the second multiplexer 58 is connected to the output terminal group. As a result, the D+/D− terminal of the USB controller 52 is commonly connected to two pins D+/D− and D+/D− of the receptacle 40.

In block 258, the CPU 42 sets connection of the input and output of the multiplexer 82 by the Type-C controller 88 in the USB dock 20C, as shown in FIG. 9B. In other words, the first input terminal group of the multiplexer 82 is connected to the first output terminal group, and a second input terminal group of the multiplexer 82 is connected to the third output terminal group. Thus, the DisplayPort signals of lane 0 and lane 1 are connected to several parts of the DisplayPort pin group 80, and terminals TX+/TX− and RX+/RX− of the USB controller 52 are connected to the USB 3.x pin group 78 via the USB 3.x hub 84. As a result, the PC 10A of the second embodiment can also be connected to the USB dock 20C capable of simultaneously supporting DisplayPort standard (two lanes) and USB 3.x standard other than the USB dock 20B shown in FIG. 7B.

The USB dock 20C can thus simultaneously support DisplayPort standard (two lanes) and USB 3.x standard. After that, when the operation of the USB device is ended, the USB dock 20C can support DisplayPort standard (four lanes) alone.

In block 260 in FIG. 11, the CPU 42 determines whether the operation of the USB device connected to the USB 3.x pin group 78 has been ended or not. When the CPU 42 detects the end of operation, the CPU 42 displays on a display (not shown) a message indicating whether the simultaneous support of DisplayPort standard (two lanes) and USB 3.x standard will be changed to the support of DisplayPort standard (four lanes) or not. If the user wishes the change, the user inputs an instruction for change by an input device (not shown). In block 261, the CPU 42 determines whether the user has input the instruction for change or not and, if the user has not, the CPU 42 ends the operation.

If the user has input the instruction for change, the EC 48 changes connection of the input and output of the first demultiplexer 56 as shown in FIG. 10A, in block 262. In other words, the first input terminal group of the first multiplexer 56 is connected to the first output terminal group, and a second input terminal group of the first multiplexer 56 is connected to the second output terminal group. Thus, the DisplayPort signals of lane 0, lane 1, lane 2 and lane 3 are supplied to four pins TX1+/TX1−, RX1+/RX1−, TX2+/TX2− and RX2+/RX2− of the receptacle 40, respectively.

In block 264, the CPU 42 sets connection of the input and output of the multiplexer 82 by the Type-C controller 88 in the USB dock 20C, as shown in FIG. 10B. In other words, the first input terminal group of the multiplexer 82 is connected to the first output terminal group, and the second input terminal group of the multiplexer 82 is connected to the second output terminal group. The DisplayPort signals of lane 0, lane 1, lane 2 and lane 3 are thereby connected to four pins of the DisplayPort pin group 80, respectively. As a result, the USB dock 20C can support DisplayPort standard (four lanes).

After that, the CPU 42 displays on a display (not shown) a message indicating whether the support of DisplayPort standard (four lanes) will be changed to the simultaneous support of DisplayPort standard (two lanes) and USB 3.x standard or not. If the user wishes the change, the user inputs an instruction for change by an input device (not shown). In block 265, the CPU 42 determines whether the user has input the instruction for change or not and, if the user has not, the CPU 42 ends the operation.

If the user has input the instruction for change, the processing of block 252 is performed again.

According to the second embodiment, the USB dock capable of simultaneously supporting DisplayPort standard (four lanes) and USB 3.x standard can be thus implemented. Furthermore, the host capable of using the USB dock can also use the other USB dock, for example, the USB dock capable of simultaneously supporting DisplayPort standard (two lanes) and USB 3.x standard or supporting DisplayPort standard (four lanes).

The various modules of the systems described herein can be implemented as software applications, hardware and/or software modules, or components on one or more computers, such as servers. While the various modules are illustrated separately, they may share some or all of the same underlying logic or code.

In the above explanations, for example, the DisplayPort signals (lane 0 and lane 1) of two lower lanes are always assigned to several pins of USB 3.x data bus pins of the USB Type-C connector, and any of the DisplayPort signals (lane 2 and lane 3) of two upper lanes and the USB signals are assigned to any of the remaining USB 3.x data bus pins of the USB Type-C connector and the USB 2.0 data bus pins. However, any of the DisplayPort signals (lane 0 and lane 1) of two lower lanes, the DisplayPort signals (lane 2 and lane 3) of two upper lanes and the USB signals may be assigned to any of the USB 3.x data bus pins of the USB Type-C connector and the USB 2.0 data bus pins.

Furthermore, each of the multiplexer and the demultiplexer changes the connections of two signals together in the above explanations, but may change the connection of each of the signals. In this case, any of the DisplayPort signals of four lanes and two USB 3.x signals may be assigned to any of the USB 2.0 data bus pins D+/D− and D+/D− and the USB 3.x data bus pins TX1+/TX1−, TX2+/TX2−, RX1+/RX1− and RX2+/RX2− of the USB Type-C connector.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device, comprising:
    a USB Type-C connector connectable to a second electronic device, the connector including at least two data pins defined under USB 2.0 standard and four data pins defined under a USB 3.x standard;
    a first signal generator that outputs four image signals;
    a second signal generator that outputs two USB 3.x signals which conforms to the USB 3.x standard;
    a first multiplexer including inputs coupled to the first signal generator and the second signal generator and outputs coupled to the four data pins defined under the USB 3.x standard of the USB Type-C connector;
    a second multiplexer including inputs coupled to the first signal generator and outputs coupled to the two data pins defined under the USB 2.0 standard of the USB Type-C connector; and
    a controller that receives identification information of the second electronic device and controls connection of the inputs of the first multiplexer to the outputs of the first multiplexer based on the identification information, and controls connection of the inputs of the second multiplexer to outputs of the second multiplexer based on the identification information,
    wherein
    the controller controls the first multiplexer and the second multiplexer such that the four image signals and the two USB 3.x signals are output to the second electronic device via the two data pins defined under the USB 2.0 standard and the four data pins defined under the USB 3.x standard.

2. The electronic device of claim 1, wherein
the four image signals comprise a first signal of lane 0, a second signal of lane 1, a third signal of lane 2, and a fourth signal of lane 3 which conform to DisplayPort standard;
the four data pins defined under the USB 3.x standard comprise a first pair of data pins and a second pair of data pins;
the controller controls the first multiplexer such that the two USB 3.x signals are output to the second electronic device via the first pair of data pins and the first signal of lane 0 and the second signal of lane 1 are output to the second electronic device via the second pair of data pins, and controls the second multiplexer such that the third signal of lane 2 and the fourth signal of lane 3 are output to the second electronic device via the two data pins defined under the USB 2.0 standard.

3. The electronic device of claim 1, wherein
the second signal generator further outputs a USB 2.0 signal which conforms to the USB 2.0 standard;
the four image signals comprise a first signal of lane 0, a second signal of lane 1, a third signal of lane 2, and a fourth signal of lane 3 which conform to DisplayPort standard;
the four data pins defined under the USB 3.x standard comprise a first pair of data pins and a second pair of data pins;
the controller controls the first multiplexer such that the two USB 3.x signals are output to the second electronic device via the first pair of data pins and the first signal of lane 0 and the second signal of lane 1 are output to the second electronic device via the second pair of data pins, and controls the second multiplexer such that the USB 2.0 signal is output to the second electronic device via the two data pins defined under the USB 2.0 standard.

4. The electronic device of claim 1, wherein
the second signal generator further outputs a USB 2.0 signal which conforms to the USB 2.0 standard;
the four image signals comprise a first signal of lane 0, a second signal of lane 1, a third signal of lane 2, and a fourth signal of lane 3 which conform to DisplayPort standard;
the controller determines a type of the second electronic device;
when the controller determines that the type of the second electronic device is a first type, the controller controls the first multiplexer and the second multiplexer such that the first signal of lane 0, the second signal of lane 1, the third signal of lane 2, the fourth signal of lane 3, and the two USB 3.x signals are output to the second electronic device via the two data pins defined under the USB 2.0 standard and the four data pins defined under the USB 3.x standard; and
when the controller determines that the type of the second electronic device is not the first type, the controller controls the first multiplexer and the second multiplexer such that the first signal of lane 0, the second signal of lane 1, and the two USB 3.x signals are output to the second electronic device via the two data pins defined under the USB 2.0 standard and the four data pins defined under the USB 3.x standard or controls the first multiplexer and the second multiplexer such that the first signal of lane 0, the second signal of lane 1, the third signal of lane 2, and the fourth signal of lane 3 are output to the second electronic device via the four data pins defined under the USB 3.x standard.

5. The electronic device of claim 4, wherein
the four data pins defined under the USB 3.x standard comprise a first pair of data pins and a second pair of data pins; and
when the controller determines that the type of the second electronic device is a first type, the controller controls the first multiplexer such that the two USB 3.x signals are output to the second electronic device via the first pair of data pins and the first signal of lane 0 and the second signal of lane 1 are output to the second electronic device via the second pair of data pins, and controls the second multiplexer such that the third signal of lane 2 and the fourth signal of lane 3 are output to the second electronic device via the two data pins defined under the USB 2.0 standard.

6. The electronic device of claim 4, wherein
the four data pins defined under the USB 3.x standard comprise a first pair of data pins and a second pair of data pins; and
when the controller determines that the type of the second electronic device is a second type, the controller controls the first multiplexer such that the two USB 3.x signals are output to the second electronic device via the first pair of data pins and the first signal of lane 0 and the second signal of lane 1 are output to the second electronic device via the second pair of data pins, and controls the second multiplexer such that the USB 2.0 signal is output to the second electronic device via the two data pins defined under the USB 2.0 standard.

7. The electronic device of claim 6, wherein
the two USB 3.x signals output from the first pair of data pins are supplied to a third electronic device via two terminals of the second electronic device which conform to USB 3.x standard, and
the first signal of lane 0 and the second signal of lane 1 output from the second pair of data pins are supplied to the third electronic device via terminals of the second electronic device which conform to Displayport standard.

8. The electronic device of claim 4, wherein
the four data pins defined under the USB 3.x standard comprise a first pair of data pins and a second pair of data pins; and
when the controller determines that the type of the second electronic device is a third type, the controller controls the first multiplexer such that the first signal of lane 0 and the second signal of lane 1 are output to the second electronic device via the first pair of data pins and the third signal of lane 2 and the fourth signal of lane 3 are output to the second electronic device via the second pair of data pins, and controls the second multiplexer such that the USB 2.0 signal is output to the second electronic device via the two data pins defined under the USB 2.0 standard.

9. The electronic device of claim 8, wherein
the first signal of lane 0 and the second signal of lane 1 output from the first pair of data pins and the third signal of lane 2 and the fourth signal of lane 3 output from the second pair of data pins are supplied to a third electronic device via four terminals of the second electronic device which conform to Displayport standard.

10. The electronic device of claim 4, wherein
the four data pins defined under the USB 3.x standard comprise a first pair of data pins and a second pair of data pins; and
when the controller determines that the type of the second electronic device is a fourth type, the controller controls the first multiplexer such that the first signal of lane 0 and the second signal of lane 1 are output to the second electronic device via the first pair of data pins and the third signal of lane 2 and the fourth signal of lane 3 are output to the second electronic device via the second pair of data pins, and controls the second multiplexer such that the two USB 3.x signals are output to the second electronic device via the two data pins defined under the USB 2.0 standard.

11. The electronic device of claim 10, wherein
the first signal of lane 0 and the second signal of lane 1 output from the first pair of data pins and the third signal of lane 2 and the fourth signal of lane 3 output from the second pair of data pins are supplied to a third electronic device via four terminals of the second electronic device which conform to Displayport standard; and
the two USB 3.x signals output from the two data pins defined under the USB 2.0 standard are supplied to the third electronic device via two terminals of the second electronic device which conform to the USB 3.x standard.

12. The electronic device of claim 4, wherein
the four data pins defined under the USB 3.x standard comprise a first pair of data pins and a second pair of data pins; and
when the controller determines that the type of the second electronic device is a fifth type, the controller controls the first multiplexer such that the first signal of lane 0 and the second signal of lane 1 are output to the second electronic device via the first pair of data pins and the two USB 3.x signals are output to the second electronic device via the second pair of data pins, and controls the second multiplexer such that the USB 2.0 signal is output to the second electronic device via the two data pins defined under the USB 2.0 standard.

13. The electronic device of claim 12, wherein
the first signal of lane 0 and the second signal of lane 1 output from the first pair of data pins are supplied to a third electronic device via two terminals of the second electronic device which conform to Displayport standard; and
the two USB 3.x signals output from the second pair of data pins are supplied to the third electronic device via two terminals of the second electronic device which conform to USB 3.x standard.

14. The electronic device of claim 4, wherein
the four data pins defined under the USB 3.x standard comprise a first pair of data pins and a second pair of data pins; and
when the controller determines that the type of the second electronic device is a sixth type, the controller controls the first multiplexer such that the first signal of lane 0 and the second signal of lane 1 are output to the second electronic device via the first pair of data pins and the third signal of lane 2 and the fourth signal of lane 3 are output to the second electronic device via the second pair of data pins.

15. The electronic device of claim 14, wherein
the first signal of lane 0 and the second signal of lane 1 output from the first pair of data pins and the third signal of lane 2 and the fourth signal of lane 3 output from the second pair of data pins are supplied to a third electronic device via four terminals of the second electronic device which conform to Displayport standard.

* * * * *